US011079549B2

(12) United States Patent
Sodagar et al.

(10) Patent No.: US 11,079,549 B2
(45) Date of Patent: Aug. 3, 2021

(54) MULTISTAGE SPOT SIZE CONVERTER IN SILICON PHOTONICS

(71) Applicant: Skorpios Technologies, Inc., Albuquerque, NM (US)

(72) Inventors: Majid Sodagar, Albuquerque, NM (US); Stephen B. Krasulick, Albuquerque, NM (US); John Zyskind, Albuquerque, NM (US); Paveen Apiratikul, Albuquerque, NM (US); Luca Cafiero, Palo Alto, CA (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 16/839,826

(22) Filed: Apr. 3, 2020

(65) Prior Publication Data
US 2020/0400891 A1 Dec. 24, 2020

Related U.S. Application Data

(63) Continuation of application No. 16/171,132, filed on Oct. 25, 2018, now Pat. No. 10,649,148.
(Continued)

(51) Int. Cl.
*G02B 6/30* (2006.01)
*G02B 6/12* (2006.01)

(52) U.S. Cl.
CPC .... *G02B 6/305* (2013.01); *G02B 2006/12061* (2013.01)

(58) Field of Classification Search
CPC ........................................ G02B 2006/12092
See application file for complete search history.

(56) References Cited

U.S. PATENT DOCUMENTS 4,182,545 A 1/1980 Greer
4,293,826 A 10/1981 Scifres et al.
(Continued)

FOREIGN PATENT DOCUMENTS

CN 101637007 1/2010
CN 106133999 11/2016
(Continued)

OTHER PUBLICATIONS

Analui et al.; "A Fully Integrated 20-Gb/s Optoelectronic Transceiver Implemented in a Standard 0.13-mu-m CMOS SOI Technology", IEEE Journal of Solid State Circuits, vol. 41, No. 12, Dec. 2006, retrieved from the Internet <http://ieeexploreleee.org/xpls/abs_all.jsp?arnumber=4014595&tag=1>, 11 pages.
(Continued)

*Primary Examiner* — Rhonda S Peace
(74) *Attorney, Agent, or Firm* — Kilpatrick Townsend & Stockton LLP

(57) ABSTRACT

A device is provided for optical mode spot size conversion to optically couple a semiconductor waveguide with an optical fiber. The device includes a waveguide comprising a waveguide taper region, which comprises a shoulder portion and a ridge portion above the shoulder portion. The ridge portion has a width that tapers to meet a width of the shoulder portion. The waveguide taper region comprises a first material. The device also has a mode converter coupled to the waveguide. The mode converter includes a plurality of stages, and each of the plurality of stages tapers in a direction similar to a direction of taper of the waveguide taper region. The mode converter is made of a second material different from the first material.

20 Claims, 11 Drawing Sheets

Related U.S. Application Data

(60) Provisional application No. 62/577,052, filed on Oct. 25, 2017.

(56) References Cited

U.S. PATENT DOCUMENTS

| | | | |
|---|---|---|---|
| 4,389,567 A | 6/1983 | Khoe et al. | |
| 4,773,720 A | 9/1988 | Hammer | |
| 4,799,749 A | 1/1989 | Borner et al. | |
| 4,886,538 A | 12/1989 | Mahapatra | |
| 4,932,032 A | 6/1990 | Koch et al. | |
| 5,078,516 A | 1/1992 | Kapon et al. | |
| 5,190,883 A | 3/1993 | Menigaux et al. | |
| 5,319,667 A | 6/1994 | Dutting et al. | |
| 5,333,219 A | 7/1994 | Kuznetsov | |
| 5,454,058 A | 9/1995 | Mace et al. | |
| 5,574,742 A | 11/1996 | Ben-michael et al. | |
| 5,579,424 A | 11/1996 | Schneider | |
| 5,586,209 A | 12/1996 | Matsuura et al. | |
| 5,633,512 A | 5/1997 | Okuda et al. | |
| 5,745,614 A | 4/1998 | Kersten et al. | |
| 5,818,989 A | 10/1998 | Nakamura | |
| 5,838,070 A | 11/1998 | Naruse et al. | |
| 5,858,814 A | 1/1999 | Goossen et al. | |
| 5,981,400 A | 11/1999 | Lo | |
| 5,987,046 A | 11/1999 | Kobayashi et al. | |
| 5,987,050 A | 11/1999 | Doerr et al. | |
| 6,101,210 A | 8/2000 | Bestwick et al. | |
| 6,108,478 A | 8/2000 | Harpin et al. | |
| 6,118,978 A | 9/2000 | Ihmels | |
| 6,192,058 B1 | 2/2001 | Abeles | |
| 6,229,792 B1 | 5/2001 | Anderson et al. | |
| 6,229,947 B1 | 5/2001 | Vawter et al. | |
| 6,310,995 B1 | 10/2001 | Saini et al. | |
| 6,316,281 B1 | 11/2001 | Lee et al. | |
| 6,339,606 B1 | 1/2002 | Alphonse | |
| 6,509,139 B1 | 1/2003 | Roberts et al. | |
| 6,571,039 B1 | 5/2003 | Al-hemyari et al. | |
| 6,690,857 B2 | 2/2004 | Zhao et al. | |
| 6,714,566 B1 | 3/2004 | Coldren et al. | |
| 6,728,279 B1 | 4/2004 | Sarlet et al. | |
| 6,768,855 B1 | 7/2004 | Bakke et al. | |
| 6,829,561 B2 | 12/2004 | Keller et al. | |
| 6,846,694 B2 | 1/2005 | Fukushima et al. | |
| 6,888,989 B1 | 5/2005 | Zhou et al. | |
| 6,931,178 B2 | 8/2005 | Saccomanno | |
| 6,956,983 B2 | 10/2005 | Morse | |
| 6,987,919 B2 | 1/2006 | Luo et al. | |
| 7,006,746 B2 | 2/2006 | Blalock et al. | |
| 7,016,560 B2 | 3/2006 | Ticknor et al. | |
| 7,058,096 B2 | 6/2006 | Sarlet et al. | |
| 7,079,727 B1 | 7/2006 | Little | |
| 7,082,235 B2 | 7/2006 | Gunn, III | |
| 7,088,890 B2 | 8/2006 | Liu | |
| 7,120,336 B2 | 10/2006 | Sandhu et al. | |
| 7,251,406 B2 | 7/2007 | Luo et al. | |
| 7,257,283 B1 | 8/2007 | Liu et al. | |
| 7,317,853 B2 | 1/2008 | Laurent-Lund et al. | |
| 7,323,353 B2 | 1/2008 | Sandhu et al. | |
| 7,326,611 B2 | 2/2008 | Forbes | |
| 7,359,588 B2 | 4/2008 | Kang et al. | |
| 7,359,607 B2 | 4/2008 | Blalock et al. | |
| 7,392,247 B2 | 6/2008 | Chen et al. | |
| 7,464,147 B1 | 12/2008 | Fakhouri et al. | |
| 7,519,257 B2 | 4/2009 | Lipson et al. | |
| 7,531,395 B2 | 5/2009 | Blomiley et al. | |
| 7,539,373 B1 | 5/2009 | Logvin et al. | |
| 7,598,527 B2 | 10/2009 | Behfar et al. | |
| 7,633,988 B2 | 12/2009 | Fish et al. | |
| 7,643,710 B1 | 1/2010 | Liu | |
| 7,701,985 B2 | 4/2010 | Webster et al. | |
| 7,720,341 B2 | 5/2010 | Blalock et al. | |
| 7,796,656 B2 | 9/2010 | Watson et al. | |
| 7,831,116 B2 | 11/2010 | Kim et al. | |
| 7,936,955 B2 | 5/2011 | Blalock et al. | |
| 7,939,934 B2 | 5/2011 | Haba et al. | |
| 7,972,875 B2 | 7/2011 | Rogers et al. | |
| 8,025,444 B2 | 9/2011 | Choi et al. | |
| 8,106,379 B2 | 1/2012 | Bowers | |
| 8,170,383 B2 | 5/2012 | Tokushima | |
| 8,195,020 B2 | 6/2012 | Sandhu et al. | |
| 8,222,084 B2 | 7/2012 | Dallesasse et al. | |
| 8,254,735 B2 | 8/2012 | Tsai | |
| 8,271,205 B2 | 9/2012 | Reja et al. | |
| 8,290,014 B2 | 10/2012 | Junesand et al. | |
| 8,320,721 B2 | 11/2012 | Cevini et al. | |
| 8,483,528 B2 | 7/2013 | Socci et al. | |
| 8,488,923 B2 | 7/2013 | Na et al. | |
| 8,542,763 B2 | 9/2013 | Forenza et al. | |
| 8,620,230 B2 | 12/2013 | Sanderovitz et al. | |
| 8,913,860 B2 | 12/2014 | Ushida et al. | |
| 9,042,697 B2 | 5/2015 | Sandhu et al. | |
| 9,075,192 B2 | 7/2015 | Adams | |
| 9,097,846 B2 | 8/2015 | Mizrahi et al. | |
| 9,195,001 B2 | 11/2015 | Hatori et al. | |
| 9,268,088 B2 | 2/2016 | Mizrahi et al. | |
| 9,274,282 B2 | 3/2016 | Kachru | |
| 9,316,785 B2 | 4/2016 | Krasulick et al. | |
| 9,316,792 B2 | 4/2016 | Park et al. | |
| 9,348,099 B2 | 5/2016 | Krishnamurthi et al. | |
| 9,354,396 B2 | 5/2016 | Baudot | |
| 9,429,693 B2 | 8/2016 | Takahashi | |
| 9,460,740 B1 | 10/2016 | Staffaroni et al. | |
| 9,529,151 B2 | 12/2016 | Goi et al. | |
| 9,625,651 B2 | 4/2017 | Kumar et al. | |
| 9,658,401 B2 | 5/2017 | Li et al. | |
| 9,810,846 B2 | 11/2017 | Taillaert et al. | |
| 9,869,815 B2* | 1/2018 | Ono | G02B 6/124 |
| 9,885,832 B2 | 2/2018 | Lambert et al. | |
| 9,933,575 B2 | 4/2018 | Kumar et al. | |
| 9,977,188 B2 | 5/2018 | Lambert et al. | |
| 10,001,600 B2 | 6/2018 | Li et al. | |
| 10,209,451 B2 | 2/2019 | Kumar et al. | |
| 10,345,521 B2 | 7/2019 | Li et al. | |
| 10,649,148 B2 | 5/2020 | Sodagar et al. | |
| 2001/0010743 A1 | 8/2001 | Cayrefourcq et al. | |
| 2001/0026670 A1 | 10/2001 | Takizawa et al. | |
| 2001/0036681 A1* | 11/2001 | Iwai | G02B 6/1228 438/31 |
| 2002/0039469 A1* | 4/2002 | Jeong | G02B 6/305 385/43 |
| 2002/0064337 A1 | 5/2002 | Behin et al. | |
| 2002/0097962 A1 | 7/2002 | Yoshimura et al. | |
| 2002/0131744 A1* | 9/2002 | Evans | G02B 6/136 385/129 |
| 2002/0197013 A1 | 12/2002 | Liu et al. | |
| 2003/0035446 A1 | 2/2003 | Griffel | |
| 2003/0042494 A1 | 3/2003 | Worley | |
| 2003/0081877 A1 | 5/2003 | Nakata et al. | |
| 2003/0128724 A1 | 7/2003 | Morthier | |
| 2003/0129660 A1 | 7/2003 | Zien et al. | |
| 2003/0138216 A1 | 7/2003 | Shimoda | |
| 2003/0210725 A1 | 11/2003 | Prassas et al. | |
| 2004/0017962 A1 | 1/2004 | Lee et al. | |
| 2004/0017976 A1* | 1/2004 | Luo | G02B 6/1228 385/43 |
| 2004/0022223 A1 | 2/2004 | Billhartz | |
| 2004/0037342 A1 | 2/2004 | Blauvelt et al. | |
| 2004/0062485 A1 | 4/2004 | Kelly et al. | |
| 2004/0066999 A1 | 4/2004 | Sakamoto et al. | |
| 2004/0077135 A1 | 4/2004 | Fan et al. | |
| 2004/0111397 A1 | 6/2004 | Chen et al. | |
| 2004/0114872 A1 | 6/2004 | Nagai | |
| 2004/0120646 A1 | 6/2004 | Fushimi et al. | |
| 2004/0120648 A1* | 6/2004 | Kwon | G02B 6/1228 385/43 |
| 2004/0120675 A1 | 6/2004 | Skinner et al. | |
| 2004/0165812 A1 | 8/2004 | Blauvelt et al. | |
| 2004/0182914 A1 | 9/2004 | Venugopalan | |
| 2004/0202440 A1 | 10/2004 | Gothoskar et al. | |
| 2004/0228384 A1 | 11/2004 | Oh et al. | |
| 2004/0245425 A1 | 12/2004 | Delpiano et al. | |
| 2004/0258360 A1 | 12/2004 | Lim et al. | |
| 2004/0259279 A1 | 12/2004 | Erchak et al. | |
| 2004/0264840 A1 | 12/2004 | Mule et al. | |

(56) References Cited

U.S. PATENT DOCUMENTS

| | | |
|---|---|---|
| 2005/0033858 A1 | 2/2005 | Swildens et al. |
| 2005/0058416 A1 | 3/2005 | Hoon Lee et al. |
| 2005/0082552 A1 | 4/2005 | Fang et al. |
| 2005/0105853 A1 | 5/2005 | Liu et al. |
| 2005/0123244 A1 | 6/2005 | Block et al. |
| 2005/0185893 A1 | 8/2005 | Liu |
| 2005/0202554 A1* | 9/2005 | Luo .................. G02B 6/1228 435/287.2 |
| 2005/0211465 A1 | 9/2005 | Sunohara et al. |
| 2005/0211993 A1 | 9/2005 | Sano et al. |
| 2005/0213618 A1 | 9/2005 | Sochava et al. |
| 2005/0226284 A1 | 10/2005 | Tanaka et al. |
| 2005/0286426 A1 | 12/2005 | Padhye et al. |
| 2006/0002443 A1 | 1/2006 | Farber et al. |
| 2006/0045157 A1 | 3/2006 | Ratowsky et al. |
| 2006/0093002 A1 | 5/2006 | Park et al. |
| 2006/0104322 A1 | 5/2006 | Park et al. |
| 2006/0109542 A1 | 5/2006 | Mizuuchi et al. |
| 2006/0115215 A1 | 6/2006 | Liu |
| 2006/0285797 A1 | 12/2006 | Little |
| 2007/0002924 A1 | 1/2007 | Hutchinson et al. |
| 2007/0223549 A1 | 9/2007 | Livshits et al. |
| 2007/0280326 A1 | 12/2007 | Piede et al. |
| 2008/0002928 A1 | 1/2008 | Li |
| 2008/0266639 A1 | 10/2008 | Melloni et al. |
| 2009/0016399 A1 | 1/2009 | Bowers |
| 2009/0020499 A1 | 1/2009 | Nottola et al. |
| 2009/0087137 A1 | 4/2009 | Doan |
| 2009/0135861 A1 | 5/2009 | Webster et al. |
| 2009/0225796 A1 | 9/2009 | Kato |
| 2009/0267173 A1 | 10/2009 | Takahashi et al. |
| 2009/0278233 A1 | 11/2009 | Pinnington et al. |
| 2009/0294803 A1 | 12/2009 | Nuzzo et al. |
| 2009/0310140 A1 | 12/2009 | Smith et al. |
| 2010/0040327 A1 | 2/2010 | Deki et al. |
| 2010/0042668 A1 | 2/2010 | Liang et al. |
| 2010/0111128 A1 | 5/2010 | Qin et al. |
| 2010/0114846 A1 | 5/2010 | LaChapelle et al. |
| 2010/0123145 A1 | 5/2010 | Lee |
| 2010/0238855 A1 | 9/2010 | Yoshida et al. |
| 2010/0247037 A1 | 9/2010 | Little |
| 2010/0266288 A1 | 10/2010 | Little et al. |
| 2010/0272385 A1 | 10/2010 | Akiyama |
| 2010/0302992 A1 | 12/2010 | Zhuang |
| 2011/0012261 A1 | 1/2011 | Choi et al. |
| 2011/0032964 A1 | 2/2011 | Sauer et al. |
| 2011/0044193 A1 | 2/2011 | Forenza et al. |
| 2011/0085572 A1 | 4/2011 | Dallesasse et al. |
| 2011/0085577 A1 | 4/2011 | Krasulick et al. |
| 2011/0085760 A1 | 4/2011 | Han et al. |
| 2011/0089524 A1 | 4/2011 | Nonogaki |
| 2011/0158584 A1 | 6/2011 | Popovic |
| 2011/0163444 A1 | 7/2011 | Hayashi |
| 2011/0165707 A1 | 7/2011 | Lott et al. |
| 2011/0205660 A1 | 8/2011 | Komura et al. |
| 2011/0211604 A1 | 9/2011 | Roscher |
| 2011/0216997 A1 | 9/2011 | Gothoskar et al. |
| 2011/0217002 A1 | 9/2011 | Mekis et al. |
| 2011/0267676 A1 | 11/2011 | Dallesasse et al. |
| 2012/0001166 A1 | 1/2012 | Doany et al. |
| 2012/0002694 A1 | 1/2012 | Bowers et al. |
| 2012/0002931 A1 | 1/2012 | Watanabe |
| 2012/0057079 A1 | 3/2012 | Dallesasse et al. |
| 2012/0057609 A1 | 3/2012 | Dallesasse et al. |
| 2012/0057610 A1 | 3/2012 | Dallesasse et al. |
| 2012/0057816 A1 | 3/2012 | Krasulick et al. |
| 2012/0091594 A1 | 4/2012 | Landesberger et al. |
| 2012/0093456 A1 | 4/2012 | Taillaert et al. |
| 2012/0120978 A1 | 5/2012 | Budd et al. |
| 2012/0149148 A1 | 6/2012 | Dallesasse et al. |
| 2012/0170931 A1 | 7/2012 | Evans et al. |
| 2012/0189317 A1 | 7/2012 | Heck et al. |
| 2012/0224813 A1 | 9/2012 | Chen et al. |
| 2012/0230635 A1 | 9/2012 | Yoshida |
| 2012/0264256 A1 | 10/2012 | Dallesasse et al. |
| 2012/0320939 A1 | 12/2012 | Baets et al. |
| 2012/0321244 A1* | 12/2012 | Suzuki .................. H01S 5/1014 385/14 |
| 2013/0022312 A1 | 1/2013 | Taillaert et al. |
| 2013/0037905 A1 | 2/2013 | Shubin et al. |
| 2013/0051727 A1 | 2/2013 | Mizrahi et al. |
| 2013/0107741 A1 | 5/2013 | Huang et al. |
| 2013/0114924 A1 | 5/2013 | Loh et al. |
| 2013/0170793 A1 | 7/2013 | Ushida et al. |
| 2013/0210214 A1 | 8/2013 | Dallesasse et al. |
| 2013/0216177 A1 | 8/2013 | Tseng et al. |
| 2013/0251299 A1 | 9/2013 | He et al. |
| 2013/0266263 A1* | 10/2013 | Kwon .................. G02B 6/1228 385/43 |
| 2013/0301975 A1 | 11/2013 | Spann et al. |
| 2013/0302920 A1 | 11/2013 | Dallesasse et al. |
| 2014/0064658 A1 | 3/2014 | Ramaswamy et al. |
| 2014/0133817 A1 | 5/2014 | Lealman et al. |
| 2014/0179036 A1 | 6/2014 | Krasulick et al. |
| 2014/0252411 A1 | 9/2014 | Kang et al. |
| 2014/0270620 A1 | 9/2014 | Anderson et al. |
| 2014/0319656 A1 | 10/2014 | Marchena et al. |
| 2015/0086153 A1 | 3/2015 | Ono et al. |
| 2015/0097211 A1 | 4/2015 | Krasulick et al. |
| 2015/0219853 A1 | 8/2015 | Kumar et al. |
| 2015/0234124 A1 | 8/2015 | Won et al. |
| 2015/0253471 A1 | 9/2015 | Takahashi |
| 2015/0253472 A1 | 9/2015 | Kumar et al. |
| 2015/0316723 A1 | 11/2015 | Taylor et al. |
| 2015/0346429 A1 | 12/2015 | Lambert et al. |
| 2015/0346430 A1 | 12/2015 | Li et al. |
| 2015/0362673 A1 | 12/2015 | Zheng et al. |
| 2016/0124148 A1 | 5/2016 | Matsumoto |
| 2016/0170142 A1 | 6/2016 | Lambert et al. |
| 2016/0306111 A1 | 10/2016 | Lambert |
| 2016/0306117 A1* | 10/2016 | Middlebrook ........ G02B 6/1221 |
| 2017/0090118 A1 | 3/2017 | Sodagar et al. |
| 2017/0242192 A1 | 8/2017 | Sodagar et al. |
| 2017/0351033 A1 | 12/2017 | Kumar et al. |
| 2018/0356596 A1 | 12/2018 | Kumar et al. |
| 2019/0170944 A1* | 6/2019 | Sodagar .................. G02B 6/305 |
| 2020/0301072 A1* | 9/2020 | Sodagar ............... G02B 6/1228 |

FOREIGN PATENT DOCUMENTS

| | | |
|---|---|---|
| EP | 0696747 | 2/1996 |
| EP | 2141525 | 1/2010 |
| EP | 2544319 | 1/2013 |
| EP | 2648906 | 10/2013 |
| EP | 2751603 | 7/2014 |
| JP | 09197179 | 7/1997 |
| JP | 2000089054 | 3/2000 |
| JP | 2003078530 | 3/2003 |
| JP | 2006186446 | 7/2006 |
| JP | 2007074202 | 3/2007 |
| JP | 2010522372 | 7/2010 |
| JP | 2010199972 | 9/2010 |
| JP | 2010281899 | 12/2010 |
| JP | 2011075917 | 4/2011 |
| JP | 2013507792 | 3/2013 |
| JP | 2014525608 | 9/2014 |
| KR | 20140060547 | 5/2014 |
| KR | 20140060548 | 5/2014 |
| TW | 201140975 | 11/2011 |
| WO | 03012512 | 2/2003 |
| WO | 2010033435 | 3/2010 |
| WO | 2011046898 | 4/2011 |
| WO | 2012078361 | 6/2012 |
| WO | 2013033252 | 3/2013 |
| WO | 2013109955 | 7/2013 |
| WO | 2014021411 | 2/2014 |
| WO | 2014025824 | 2/2014 |
| WO | 2014176561 | 10/2014 |
| WO | 2015054491 | 4/2015 |
| WO | 2015120260 | 8/2015 |
| WO | 2015134968 | 9/2015 |

(56) References Cited

FOREIGN PATENT DOCUMENTS

| WO | 2015183992 | 12/2015 |
|---|---|---|
| WO | 2016172202 | 10/2016 |

OTHER PUBLICATIONS

Barkai, A., et al., "Efficient Mode Converter for Coupling Between Fiber and Micrometer Size Silicon Waveguides." IEEE. 2007. pp. 49-51.

Coldren et al.; "Tunable Semiconductor Lasers: A Tutorial"; Journal of Lightwave Technology, Jan. 2004; 22(1):193-202.

Coldren; "Monolithic Tunable Diode Lasers"; IEEE Journal on Selected Topics in Quantum Electronics, Nov./Dec. 2000; 6(6):988-999.

Hildebrand, et al.; "The Y-Laser: A Multifunctional Device for Optical Communication Systems and Switching Networks"; Journal of Lightwave Technology, Dec. 1993; 11(12):2066-2075.

Isaksson, et al.; "10 Gb/s Direct Modulation of 40 nm Tunable Modulated-Grating Y-branch Laser"; in Optical Fiber Communication Conference and Exposition and the National Fiber Optic Engineers Conference, Technical Digest (CD) (Optical Society of America, 2005), paper OTuE2.

Khilo, A., et al., "Efficient Planar Fiber-to-Chip Coupler Based on Two-Stage Adiabatic Evolution." Optics Express. vol. 18, No. 15, Jul. 2010, pp. 15790-15806.

Kochem, et al., "Frequency Stabilized High Brightness Tapered Amplifier and Laser Modules", Proc of SPEI, vol. 6997 69971A-1, downloaded from: http://proceedings.spiedigitallibryrv.org/ on Feb. 19, 2016, 11 pages.

Kuznetsov, et al.; "Asymmetric Y-Branch Tunable Semiconductor Laser with 1.0 THz Tuning Range"; IEEE Photonics Technology Letters, Oct. 1992; 4(10):1093-1095.

Laroy, et al.; "Characteristics of the New Modulated Grating Y laser (Mg—Y) for Future Wdm Networks"; Proceedings Symposium IEEE/LEOS Benelux Chapter, 2003, Enschede, pp. 55-58, retrieved from the Internet: <http://leosbenelux.org/symp03/s03p055.pdf>.

Laroy; "New Concepts of Wavelength Tunable Laser Diodes for Future Telecom Networks"; [dissertation] Universiteit Gent, 2006 [in Dutch and English], 162 pages.

Laroy; "New Widely Tunable Laser Concepts for Future Telecommunication Networks"; FTW-symposium, Belgium, 2002; retrieved from the Internet: <http://photonics.intec.ugent.be/download/pub_1625.pdf>, 2 pages total.

Lumerical Knowledge Base; "Evanescent Waveguide Couplers"; Web. Mar. 6, 2015; <https://kb.lumerical.com/en/pic_passive_waveguide_couplers_evanescent.html>.

Magno, et al.; "Multiphysics Investigation of Thermo-optic Effect in Silicon-on-Insulator Waveguide Arrays"; Excerpt from the Proceedings of the COMSOL Users Conference 2006, retrieved from the Internet: <http://cds.comsol.com/access/dl/papers/1628/Magno.pdf>, 6 pages total.

Morthier, et al.; "New Widely Tunable Edge-Emitting Laser Diodes at 1.55 μm Developed in the European IST-project Newton"; Semiconductor and Organic Optoelectronic Materials and Devices. Edited by Zah, Chung-En; Luo, Yi; Tsuji, Shinji. Proceedings of the SPIE, 2005; 5624:1-8; retrieved from the Internet: <http://photonics.intec.ugent.be/download/pub_1800.pdf>.

Morthier; "New Widely Tunable Lasers for Optical Networks"; Newton Project No. IST-2000-28244, Dec. 2001; retrieved from the Internet: <http://www.ist-optimist.unibo.it/pdf/network/projects_public/NEWTON/Deliverables/D01.pdf>, 5 pages total.

Park, H., et al., "A Fiber-to-Chip Coupler Based on Si/SiON Cascaded Tapers for Si Photonic Chips" Optics Express. vol. 21, No. 24, Dec. 2013, pp. 29313-29319.

Passaro, et al.; "Investigation of Thermo-Optic Effect and Multireflector Tunable Filter/Multiplexer in SOI Waveguides"; Optics Express, May 2, 2005; 13(9):3429-3437.

Wesstrom, et al.; "Design of a Widely Tunable Modulated Grating Y-branch Laser Using the Additive Vernier Effect for Improved Super-Mode Selection"; IEEE 18th International Semiconductor Laser Conference, 2002, 99-100; retrieved from the Internet: <http://photonics.intec.ugent.be/download/pub_1603.pdf>.

Wesström, et al.; "State-of-the-Art Performance of Widely Tunable Modulated Grating Y-Branch Lasers"; Optical Fiber Communication Conference, Technical Digest (CD) (Optical Society of America, 2004), paper TuE2.

Yamada, K., "Chapter 1: Silicon Photonic Wire Waveguides: Fundamentals and Applications." Silicon Photonics II, Topics in Applied Physics 119, 1-29 (2011).

ISR/WO mailed on Nov. 16, 2012 for International Patent Application No. PCT/US2012/052913 filed on Aug. 29, 2012, all pages.

Written Opinion, dated May 11, 2015, for International Patent Application PCT/US2015/014801 with the International filing date of Feb. 6, 2015, 9 pages.

U.S. Non-Final Office Action dated Sep. 2, 2014 for U.S. Appl. No. 13/597,117, filed Aug. 28, 2012, all pages.

International Search Report and Written Opinion for PCT/US2015/032725 dated Aug. 27, 2015, 11 pages.

ISR/WO mailed on Jan. 22, 2015 for International Patent Application No. PCT/US2014/059900 filed on Oct. 9, 2014, all pages.

International Preliminary Report on Patentability dated Dec. 8, 2016 for International Patent Application No. PCT/US2015/032725, filed May 27, 2015; all pages.

Restriction Requirement dated Dec. 27, 2016 for U.S. Appl. No. 15/051,348, filed Feb. 23, 2016; all pages.

Non-final Office Action dated May 19, 2017 for U.S. Appl. No. 15/051,348, filed Feb. 23, 2016; all pages.

European Supplemental Search Report dated Apr. 9, 2015 for European Patent Application No. 1227040.2-1553, filed Aug. 29, 2012; all pages.

Supplemental Notice of Allowance dated Apr. 24, 2017 for U.S. Appl. No. 14/722,983; all pages.

Non-Final Office Action dated Mar. 7, 2017 for U.S. Appl. No. 15/133,898; all pages.

Notice of Allowance dated Jul. 26, 2017 for U.S. Appl. No. 15/133,898; all pages.

Non-Final Office Action dated Jun. 16, 2017 for U.S. Appl. No. 15/133,920; all pages.

Non-Final Office Action dated Jun. 2, 2017 for U.S. Appl. No. 15/588,128; all pages.

Non-Final Office Action dated Sep. 2, 2014 for U.S. Appl. No. 13/597,117; all pages.

First Action Interview Pilot Program Pre-Interview Communication dated Aug. 25, 2016 for U.S. Appl. No. 14/615,942; all pages.

Notice of Allowance dated Dec. 14, 2016 for U.S. Appl. No. 14/615,942; all pages.

Final Office Action dated Feb. 22, 2016 for U.S. Appl. No. 14/642,429; all pages.

Notice of Allowance dated Jun. 15, 2016 for U.S. Appl. No. 14/642,429; all pages.

Restriction Requirement dated Oct. 3, 2016 for U.S. Appl. No. 14/722,970; all pages.

Notice of Allowance dated Jan. 18, 2017 for U.S. Appl. No. 14/722,983; all pages.

Restriction Requirement dated Jul. 22, 2016 for U.S. Appl. No. 14/722,983; all pages.

Supplemental Notice of Allowance dated Feb. 1, 2017 for for U.S. Appl. No. 14/722,983; all pages.

Restriction Requirement dated Oct. 6, 2016 for U.S. Appl. No. 15/133,898; all pages.

Non-Final Office Action dated Oct. 6, 2016 for U.S. Appl. No. 15/133,920; all pages.

Notice of Allowance dated Jan. 25, 2017 for U.S. Appl. No. 15/262,937; all pages.

Notice of Allowance dated Sep. 27, 2017 for U.S. Appl. No. 14/772,970; all pages.

PCT/US2012/052913, "International Preliminary Report on Patentability", dated Mar. 13, 2014, all pages.

PCT/US2015/019430, "International Preliminary Report on Patentability", dated Sep. 22, 2016, all pages.

PCT/US2015/019430, "International Search Report and Written Opinion", dated May 29, 2015, all pages.

(56) References Cited

OTHER PUBLICATIONS

PCT/US2016/028431, "International Search Report and Written Opinion", dated Jul. 28, 2016, all pages.
Non-Final Office Action dated Jun. 3, 2019, for U.S. Appl. No. 16/171,132, 16 pages.
Notice of Allowance dated Jan. 6, 2020 for U.S. Appl. No. 16/171,132, 9 pages.

* cited by examiner

MULTISTAGE SPOT SIZE CONVERTER IN SILICON PHOTONICS

CROSS-REFERENCES TO RELATED APPLICATIONS

This application is a continuation of U.S. Nonprovisional patent application Ser. No. 16/171,132, filed on Oct. 25, 2018, entitled "MULTISTAGE SPOT SIZE CONVERTER IN SILICON PHOTONICS," which claims priority to U.S. Provisional Patent Application No. 62/577,052, filed on Oct. 25, 2017, entitled "MULTISTAGE SPOT SIZE CONVERTER IN SILICON PHOTONICS," the disclosures of which are hereby incorporated by reference in their entirety for all purposes.

The following are incorporated by reference for all purposes: U.S. patent application Ser. No. 14/615,942, filed on Feb. 6, 2015; U.S. patent application Ser. No. 14/722,970, filed on May 27, 2015; U.S. patent application Ser. No. 14/722,983, filed on May 27, 2015; and U.S. patent application Ser. No. 15/051,348. The above applications describe examples of fiber couplers and mode expanders, which, in some embodiments, the ideas in this disclosure could be combined with and/or work as a substitute for.

BACKGROUND

This application relates to optical waveguides. More specifically, and without limitation, this application relates to devices and methods for coupling a silicon waveguide to an optical fiber.

Photonic devices, including optical waveguides, are being integrated on semiconductor chips. Photonic devices integrated on semiconductor chips are often designed for use in fiber-optic communication systems. Improved devices and methods for coupling a silicon waveguide to an optical fiber are desirable.

BRIEF SUMMARY

Embodiments of the invention include multistage spot size converters for coupling a smaller optical mode, such as a fundamental mode in a semiconductor waveguide, to a larger optical mode, such as a fundamental mode in an optical fiber.

According to some embodiments of the present invention, a device is provided for optical mode spot size conversion to optically couple a semiconductor waveguide with an optical fiber. The device includes a waveguide comprising a waveguide taper region, which comprises a shoulder portion and a ridge portion above the shoulder portion. The ridge portion has a width that tapers to meet a width of the shoulder portion. The waveguide taper region comprises a first material. The device also has a mode converter coupled to the waveguide. The mode converter includes a plurality of stages, and each of the plurality of stages tapers in a direction similar to a direction of taper of the waveguide taper region. The mode converter is made of a second material different from the first material.

In some embodiments of the above device, the mode converter comprises a first stage and a second stage of the plurality of stages. The second stage overlies the first stage. The first stage includes a first portion that does not taper and a second portion that tapers. The second stage extends over the first portion and the second portion of the first stage.

In some embodiments, the first portion of the first stage of the mode converter and the shoulder portion of the waveguide have a common width.

In some embodiments, the waveguide also includes a waveguide extension region coupled between the waveguide taper region and the mode converter. The waveguide extension region is made of the first material. The waveguide extension region has a thickness equal to a combined thickness of the shoulder portion and the ridge portion of the waveguide taper region. The waveguide extension region and the shoulder portion of the waveguide taper region have a common width. In some embodiments, the waveguide extension region has a common thickness as the waveguide taper region and a first stage of the mode converter. In some embodiments, the waveguide extension region has a common width as an output end of the waveguide taper region and an input end of a first stage of the mode converter.

In some embodiments, the number of stages in the mode converter is greater than three and less than eleven. In some embodiments, the number of stages in the mode converter is seven.

In some embodiments, the ridge portion tapers from a narrower width of 0.75-2.75 µm near an input end to a wider width of 2.0-4.0 µm near an output end. In some embodiments, the waveguide taper region, including the ridge portion and the shoulder portion, has a height of 0.75-2.25 µm.

In some embodiments, at an output end of the mode converter, the mode converter has a rectangular (e.g., square) cross-section, and the plurality of stages has a common maximum width.

In some embodiments, the mode converter comprises a first stage and a second stage of the number of stages. The first stage has a first maximum width, and the second stage has a second maximum width. The first maximum width of the first stage is greater than the second maximum width of the second stage.

In some embodiments, at a cross section of the mode converter at an output end of the device, each stage of the plurality of stages has a different width. A first stage of the plurality of stages, which is closer to the shoulder portion, has a wider width than a second stage of the plurality of stages, which is farther from the shoulder portion than the first stage.

In some embodiments, the first stage of the mode converter has a first length, the second stage of the mode converter has a second length, and the first length is equal to the second length. In some embodiments, at a cross section of the mode converter at an output end of the device, each stage of the plurality of stages has a common width, and the mode converter has a rectangular cross-section.

In some embodiments, the first material is crystalline silicon and the second material is non-crystalline silicon. The non-crystalline silicon can include amorphous silicon and polycrystalline silicon.

In some embodiments, the waveguide taper region and the mode converter are integrated on a substrate that includes a buried-oxide layer overlying a handle layer.

In some embodiments, the waveguide taper region comprises crystalline silicon in a device layer disposed on a buried-oxide layer of an SOI (silicon-on-insulator) substrate. The mode converter comprises non-crystalline silicon formed on the buried-oxide layer of the SOI substrate.

According to some embodiments of the present invention, a method is provided for converting optical mode spot size between a semiconductor waveguide and an optical fiber. The method includes receiving a light beam at a waveguide comprising a waveguide taper region. The waveguide taper region comprises a shoulder portion and a ridge portion above the shoulder portion. The ridge portion has a width that tapers to meet a width of the shoulder portion, and the waveguide taper region comprises a first material. The method includes expanding the light beam in the waveguide taper region. The method further includes coupling the light beam from the waveguide taper region to a mode converter. The mode converter comprises a plurality of stages. Each of the plurality of stages tapers in a direction similar to a direction of taper of the waveguide taper region. The mode converter is made of a second material different from the first material. The method includes expanding the light beam through each of the plurality of stages in the mode converter. The method further includes coupling the light beam to the optical fiber.

In some embodiments of the above the method, the method also includes transmitting the light beam through a first stage of the mode converter to a second stage. The first stage comprises a first portion that does not taper and a second portion that tapers. Further, the second stage extends over the first portion and the second portion of the first stage.

In some embodiments of the method, the method also includes transmitting the light beam through a waveguide extension region coupled between the waveguide taper region and the mode converter. The waveguide extension region is made of the first material. The waveguide extension region has a thickness equal to a combined thickness of the shoulder portion and the ridge portion of the waveguide taper region. The waveguide extension region and the shoulder portion of the waveguide taper region have a common width.

According to some embodiments of the present invention, a device is provided for optical mode spot size conversion to optically couple a semiconductor waveguide with an optical fiber. The device includes a waveguide and a mode converter. The waveguide includes a waveguide taper region and a waveguide extension region coupled to the waveguide taper region. The waveguide taper region includes a shoulder portion and a ridge portion above the shoulder portion. The ridge portion has a width that tapers to meet a width of the shoulder portion. The waveguide taper region is made of a first material, and the waveguide extension region is made of the first material. The waveguide extension region has a thickness equal to a combined thickness of the shoulder portion and the ridge portion of the waveguide taper region. The waveguide extension region and the shoulder portion of the waveguide taper region have a common width. The mode converter is coupled to the waveguide extension region. The mode converter includes a plurality of stages, each of the plurality of stages tapering in a direction similar to a direction of taper of the waveguide taper region. The mode converter includes a first stage and a second stage of the plurality of stages. The first stage comprises a first portion that does not taper and a second portion that tapers, and the second stage extends over the first portion and the second portion of the first stage. The mode converter is made of a second material different from the first material.

In some embodiments of the above device, the ridge portion tapers from a narrower width of 0.75-2.75 µm near an input end to a wider width of 2.0-4.5 µm near an output end. In some embodiments, the waveguide extension region has a common thickness as the waveguide taper region and the first stage of the mode converter.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides preferred exemplary embodiment(s), and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This application discloses embodiments of a mode expander a spot size converter (SSC) for coupling a smaller optical mode, such as a fundamental mode in a semiconductor waveguide, to a larger optical mode, such as a fundamental mode in an optical fiber (e.g., one or more SSCs to couple one or more waveguides of an optical transceiver to one or more optical fibers in a quad small form-factor pluggable (QSFP) module).

Figure 1:
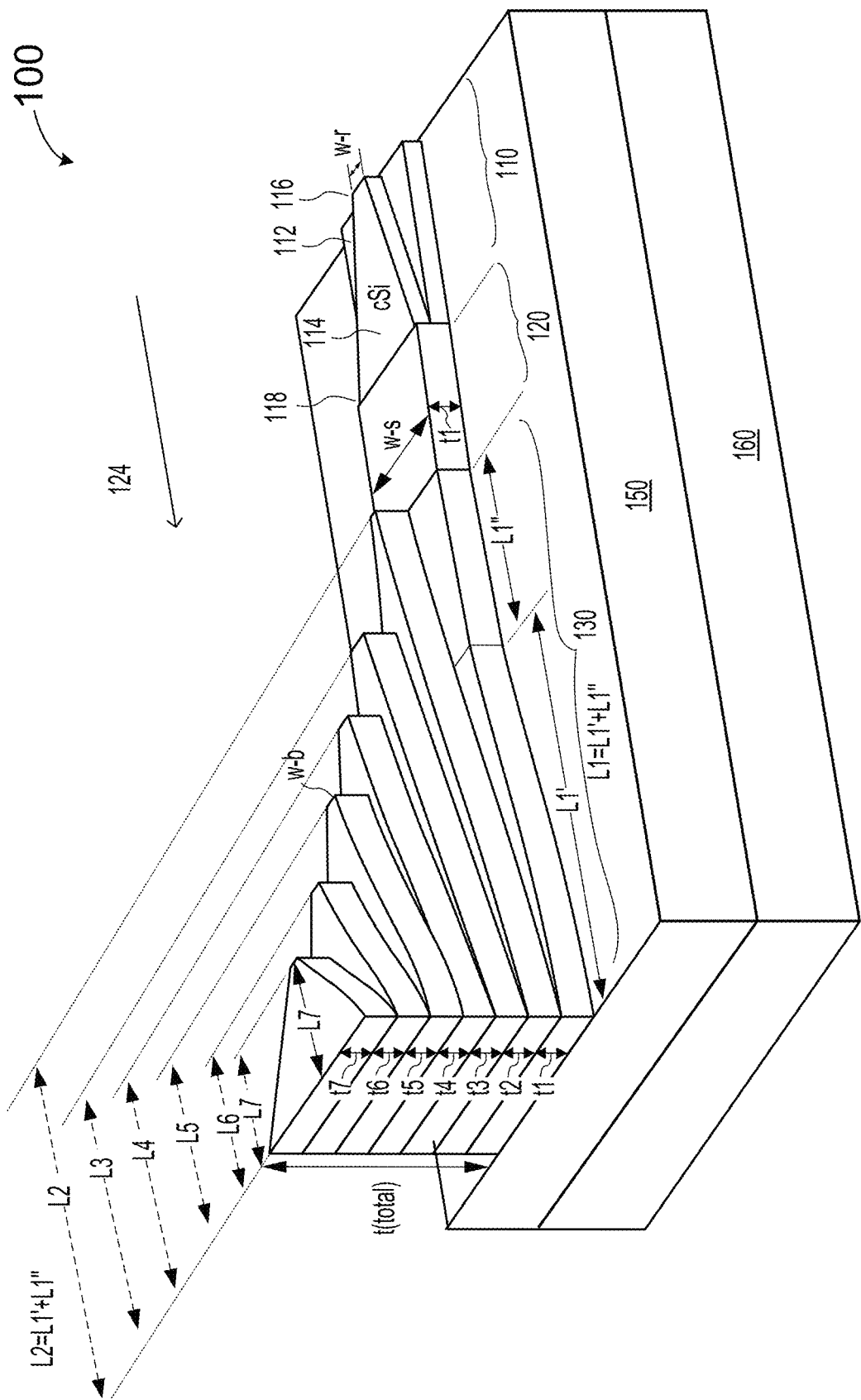
FIG. 1 is a perspective view diagram illustrating a multistage spot size converter according to some embodiments of the present invention.
Figure 2:
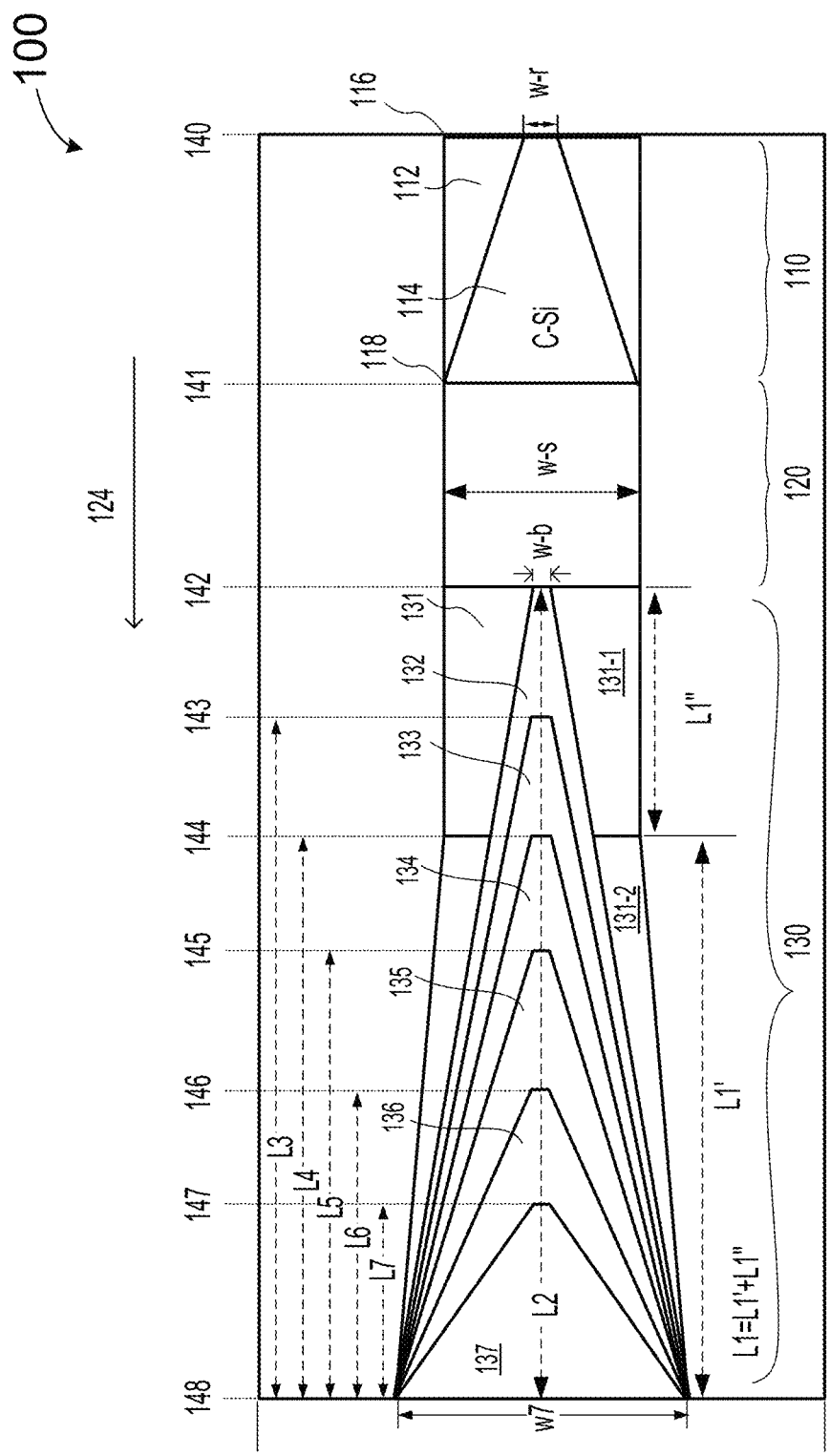
FIG. 2 is a top view diagram illustrating the multistage spot size converter of FIG. 1 according to some embodiments of the present invention.

FIG. 1 is a perspective view diagram illustrating a multistage spot size converter, and FIG. 2 is a top view diagram illustrating the multistage spot size converter of FIG. 1 according to some embodiments of the present invention. In FIGS. 1 and 2, similar components and/or features may have the same reference label. Further, FIG. 2 includes cut lines 140-148 indicating locations in the device where cross-sectional illustration will be described.

Figure 10:
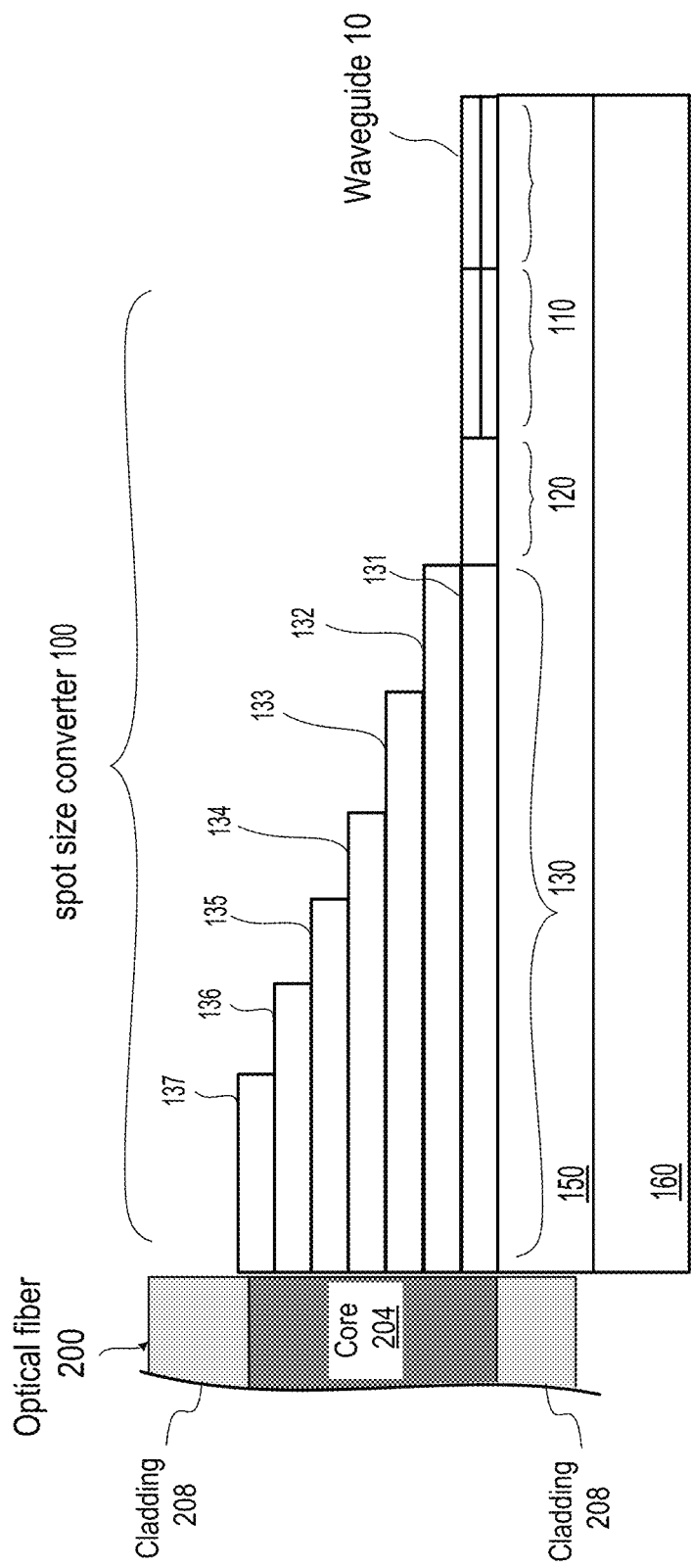
FIG. 10 is a cross-sectional view diagram illustrating the multistage spot size converter coupled to an optical fiber according to some embodiments of the present invention.

As shown in FIGS. 1 and 2, the spot size converter 100 includes a waveguide taper region 110, an extension region 120, and a mode converter 130. In some embodiments, the extension region can be omitted. The spot size converter 100 is configured to optically couple a semiconductor waveguide, to the right of the waveguide taper region 110, with an optical fiber, to the left of the mode converter 130. Both the semiconductor waveguide and optical fiber are not shown in FIGS. 1 and 2, but are illustrated in FIG. 10. In this embodiment, the waveguide taper region 110, the extension region 120, and the mode converter 130 can be integrated on a $SiO_2$ layer 150 on a handle substrate 160 in a silicon-on-insulator (SO1) wafer.

The waveguide taper region 110 includes a shoulder portion 112 and a ridge portion 114. The waveguide taper region 110 has an input end 116 and an output end 118. In some embodiments, the input end 116 is coupled to a waveguide (not shown). The waveguide can have a rectangular cross section. In some embodiments, the waveguide can have a cross section that is not rectangular (e.g., trapezoidal or inverted 'T' shape with a crystalline-silicon ridge on top of a crystalline-silicon shoulder). The output end 118 is coupled with the extension region 120. Alternatively, the output end 118 can be coupled directly to the mode converter 130.

In FIG. 1, the shoulder portion 112 has a width w-s. The ridge portion 114 tapers from the input end 116 to the output end 118. The ridge has an initial width, w-r, at the input end 116. The width of the ridge portion 114 expands from w-r at the input end 116 to w-s at the output end 118. The waveguide taper region 110 helps relax alignment tolerances for coupling to the extension or mode converter. The ridge portion 114 tapers from the input end 116 to the output end 118 so that an optical beam expands as it is transmitted from the input end 116 to the output end 118. For example, a beam can be transmitted from an external waveguide (not shown), through the input end 116 through the output end 118 of the waveguide taper region 110, and to an optical fiber having a larger core than the waveguide. As the beam propagates through the waveguide taper region 110, the beam expands adiabatically. A direction of beam propagation 124 is shown as an arrow going from the input end 116 to the output end 118.

Figure 3:
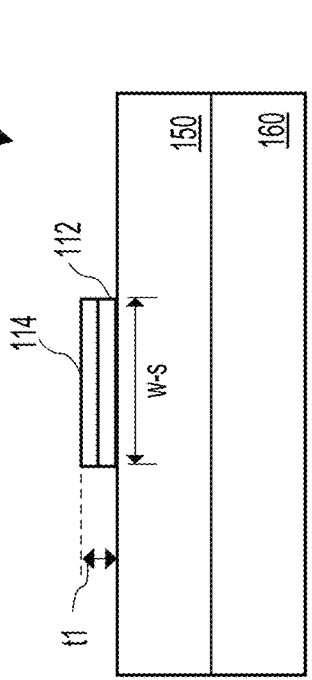
FIG. 3 is a cross-sectional view diagram illustrating an input side of the waveguide taper region of the multistage spot size converter of FIGS. 1 and 2 according to some embodiments of the present invention.

FIG. 3 is a cross-sectional view diagram illustrating an input side of the waveguide taper region of the multistage spot size converter of FIGS. 1 and 2 according to some embodiments of the present invention. FIG. 3 depicts a cross section of the input end 116 of the waveguide taper region 110 of the spot size converter 100 in FIGS. 1 and 2, along the cut line 140 in FIG. 2. The waveguide taper region 110 at the input end comprises the shoulder portion 112 and the ridge portion 114. The shoulder portion 112 has a thickness, t-s, and a width, w-s. In some embodiments, the width, w-s, of the shoulder portion 112 can range between 0.75 and 4.5 µm (e.g., 0.75, 1, 1.25, 1.5, 1.75, 2, 2.25, 2.5, 2.75, 3, 3.5, 4, or 4.5 µm). The thickness (sometimes referred to as height) of the shoulder t-s can range between 0.2 and 2 µm (e.g., 0.2, 0.5, 1.0, 1.5, or 2 µm). The combined thickness t1 of the shoulder portion 112 and the ridge portion 114 can range between 0.75 and 2.25 µm (e.g., 1.0, 1.5, 1.75, 2, or 2.25 µm). The shoulder portion 112 is made of crystalline silicon (c-Si). In some embodiments, the shoulder portion 112 can be simply an extension of an external waveguide (not shown) fabricated on a substrate (e.g., a substrate comprising silicon on insulator and/or $SiO2$). In some embodiments, the waveguide taper region 110 can further comprise a substrate and/or cladding material.

Figure 4:
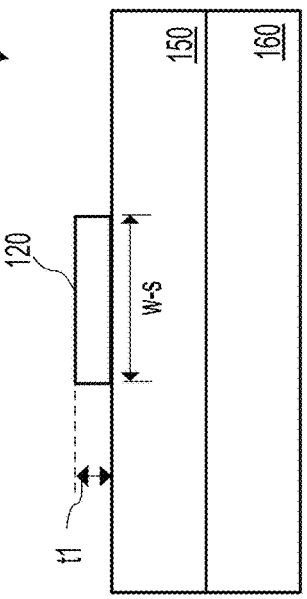
FIG. 4 is a cross-sectional view diagram illustrating an output side of the waveguide taper region 110 of the multistage spot size converter 100 of FIG. 1.

FIG. 4 is a cross-sectional view diagram illustrating an output side of the waveguide taper region 110 of the multistage spot size converter 100 of FIG. 1. FIG. 4 depicts a cross section of the output end 118 of the waveguide taper region 110 of the spot size converter 100 in FIGS. 1 and 2, along the cut line 141 in FIG. 2. The waveguide taper region 110 at the output end comprises the shoulder portion 112 and the ridge portion 114. It can be seen that, in this example, the shoulder portion 112 at the output end has the same width, w-s, as the input end. On the other hand, the ridge portion 114 has tapered and expanded to a width of w-s.

Figure 5:
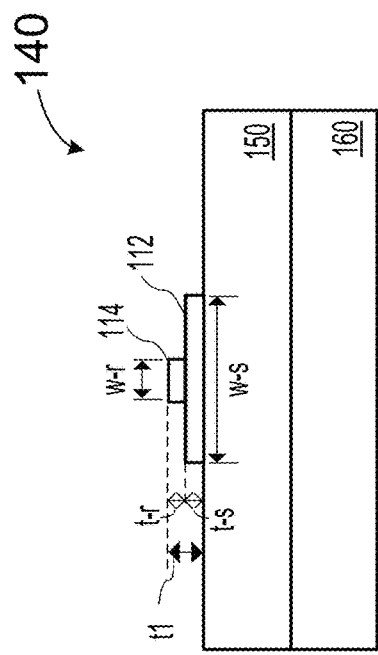
FIG. 5 is a cross-sectional view diagram illustrating an input side of the waveguide extension region 120 of the multistage spot size converter 100 of FIGS. 1 and 2.
Figure 6:
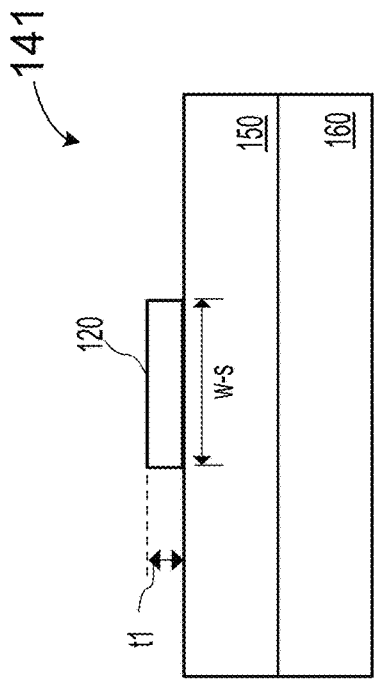
FIG. 6 is a cross-sectional view diagram illustrating an output side of the waveguide extension region 120.

FIG. 5 is a cross-sectional view diagram illustrating an input side of the waveguide extension region 120 of the multistage spot size converter 100 of FIGS. 1 and 2, and FIG. 6 is a cross-sectional view diagram illustrating an output side of the waveguide extension region 120. In some embodiments, the waveguide extension region 120 has a constant width, w-s, matching the width at the output end of the waveguide taper region 110. Therefore, the width, w-s, of the waveguide extension region 120 can range between 0.75 and 4.5 µm (e.g., 0.75, 1, 1.25, 1.5, 1.75, 2, 2.25, 2.5, 2.75, 3, 3.5, 4, or 4.5 µm). The thickness (sometimes referred to as height) of waveguide extension region 120 can be the same as the combined thickness, t1, of the shoulder portion 112 and the ridge portion 114, and can range between 0.75 and 2.25 µm (e.g., 1.0, 1.5, 1.75, 2, or 2.25 µm). The waveguide extension region 120 can be made of crystalline silicon (c-Si). In some embodiments, the waveguide extension region 120 can be fabricated in the crystalline silicon device layer of an SOI substrate (e.g., a substrate comprising silicon on insulator and/or $SiO2$). In some embodiments, the waveguide extension region 120 can further comprise a substrate and/or cladding material.

Referring back to FIGS. 1 and 2, the spot size converter 100 comprises the mode converter 130. The mode converter 130 comprises a plurality of stages. In this embodiment, the spot size converter 100 includes seven stages, 131-137. In FIG. 2, an input end is shown at cut line 142, and an output end is shown at cut line 148. An optical beam is expanded going from the input end at 142 to the output end at 148. Even though FIGS. 1 and 2 show the mode converter 130 having seven stages, other embodiments of mode converters can have fewer or more stages.

Each stage has a beginning width, w-b, which is the most narrow part of the stage. In some embodiments, one or more stages have different beginning widths, w-b.

Each stage has a thickness, e.g., measured in a direction normal to a surface of a substrate that the spot size converter 100 is on. The first stage has a first thickness, t1; the second stage has a second thickness, t2; and so on to the n-th stage. There is a total thickness, t(total), which is equal to the sum of the thickness of each stage. Each stage has a length. The length of the first stage is L1, the length of the second stage is L2, and so on to the n-th stage. In the embodiment shown, n=7. The first stage 131 is divided into a first portion 131-1 with length L1' and a second portion 131-2 with a length of L1". The first stage 131-1 does not taper along the length L1". The second stage 131-2 tapers along the length L1'. In some embodiments, L2=L1'+L1". In some embodiments, splitting the first stage into two portions helps with symmetry between x (width) and y (thickness) mode confinement. In some embodiments, the length of the second stage can be shorter than the length of the first stage, i.e., L2<L1'+L1".

A table of dimensions of the components in spot size converter 100 depicted in FIGS. 1-6 is shown below. The ranges and values below are meant to be exemplary, and not meant to limit the scope of the invention. In some embodiments, ranges of dimensions below are used to adiabatically expand an optical mode from a silicon waveguide to an optical fiber. In some embodiments, ranges below are used to adiabatically expand an optical mode from a silicon waveguide to an optical fiber in a compact distance to save room on a chip.

| Dimension | Example Ranges (µm) | Example Values (µm) |
| --- | --- | --- |
| L1' | 200-900 | 637, 750, 792 |
| L1" | 100-500 | 208, 250, 363 |
| L2 | 200-1200 | 900, 1000 |
| L3 | 200-1080 | 917, 925, 933 |
| L4 | 100-975 | 782, 800, 833 |
| L5 | 100-880 | 708, 725, 728 |
| L6 | 100-790 | 484, 500, 521 |
| L7 | 50-710 | 300, 333, 350 |
| t1 | 0.75-2.25 | 1.0, 1.5, 1.75 |
| t2 | 0.3-1.5 | 0.6, 0.7, 0.8 |
| t3 | 0.5-2.2 | 1.0, 1.1, 1.2 |
| t4 | 0.9-3.6 | 1.5, 1.6, 1.8 |
| t5 | 1.1-3.8 | 2.0, 2.1, 2.2 |
| t6 | 1.3-4.3 | 2.3, 2.5, 2.6 |
| t7 | 1.5-4.6 | 2.8, 2.9, 3.0 |
| t(total) | 8-17 | 12, 12.5, 12.9 |
| w-r | 0.75-3.5, 1.0-2.0 | 1.3, 1.5, 1.75 |
| w-s | 0.75-4.5 | 2.5, 3, 3.5 |
| w1 | 8-15 | 11. 5, 11.7, 12, 12.7 |
| w7 | 9-20 | 12, 14.1, 14.3, 15 |
| w-delta | 0.1-0.5 | 0.2, 0.3, 0.4 |
| w-b | 0.0-1.0 | 0.3, 0.4, 0.9 |

In mode converter 130, stage 1 thickness, t1, is equal to a thickness of the waveguide taper region 110 in the waveguide (e.g., thickness of the shoulder portion plus thickness of the ridge portion). From stage 2, thicknesess of subsequent stages (higher-numbered stages) are thicker than preceding stages (lower-numbered stages). In some embodiments, L1' is more than twice the length of L1" and/or L2 is 1000 µm or less. In some embodiments, the length of stages are 50%-90% of the stage below (e.g., directly below).

In some embodiments, a number of stages other than seven for the mode converter are used. Though performance can be increased with a higher number of stages, complexity and difficulty in fabricating also increase. In an embodiment, a device with seven stages was found to be better than another device with six stages.

In some embodiments, the beginning width ("tips") of tapers in the mode converter, (w-b), may be 300 nm or narrower. In some embodiments, 300 nm is a dimension of a photolithography lens used to fabricate the device, but the tips can be much narrower (e.g., 10 nm). In some embodiments, the tips can also be thicker. Also, edges of tapers may not be as sharp as shown, but instead are somewhat rounded, resulting in a design closer to a vertical taper (e.g., instead of vertically stepped profile) than what is depicted in the figures.

Figure 7A:
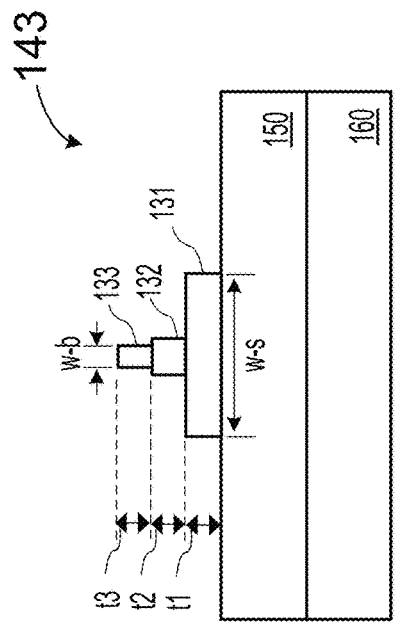
FIGS. 7A-7G are cross-sectional view diagrams illustrating cross sections of the mode converter 130 of the multistage spot size converter 100 of FIGS. 1 and 2.

FIGS. 7A-7G are cross-sectional view diagrams illustrating cross sections of the mode converter 130 of the multistage spot size converter 100 of FIGS. 1 and 2. More particularly, FIG. 7A depicts a cross section of the mode converter 130 at the cut line 142 shown in FIG. 2, where the first stage 131 has a width of w-s matching the width of the waveguide extension region 120 or the width of the waveguide taper region 110. At cut line 142, the tip of the second stage 132 has a width of w-b.

Figure 7B:
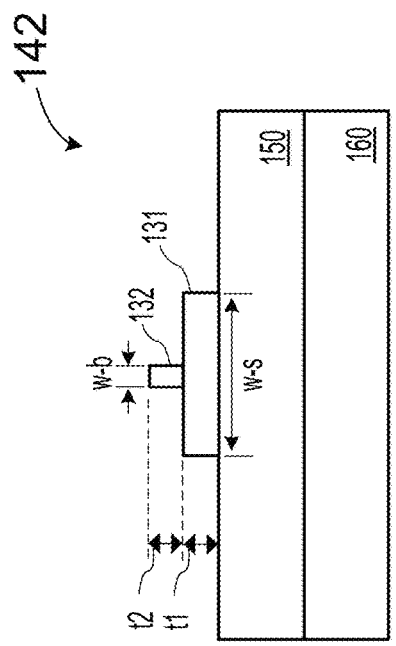
Figure 7C:
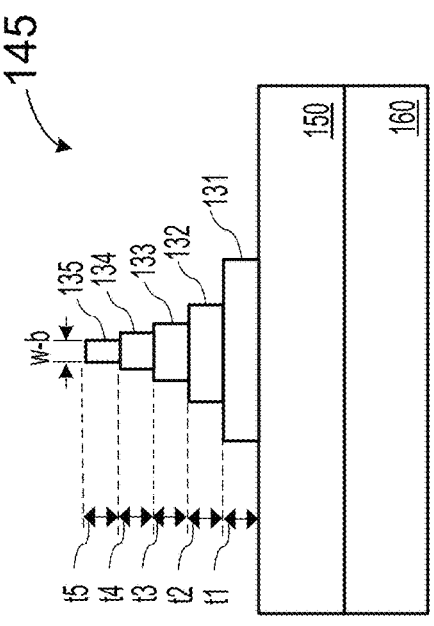
Figure 7D:
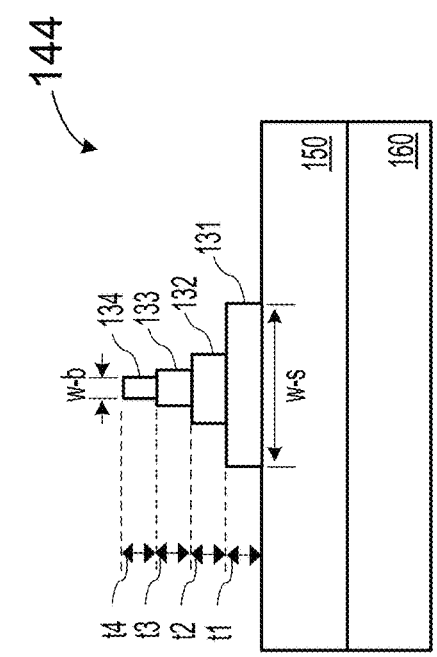
Figure 7E:
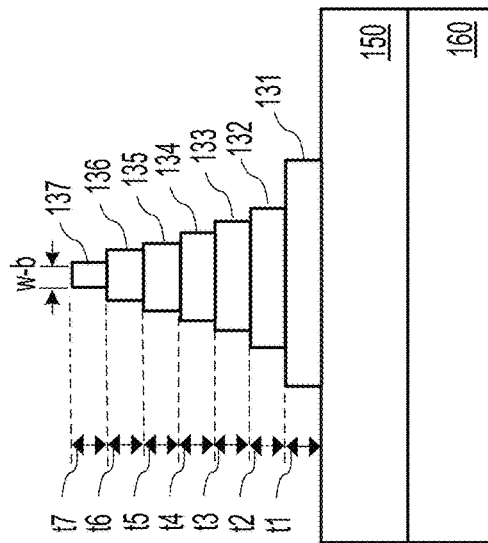
Figure 7G:
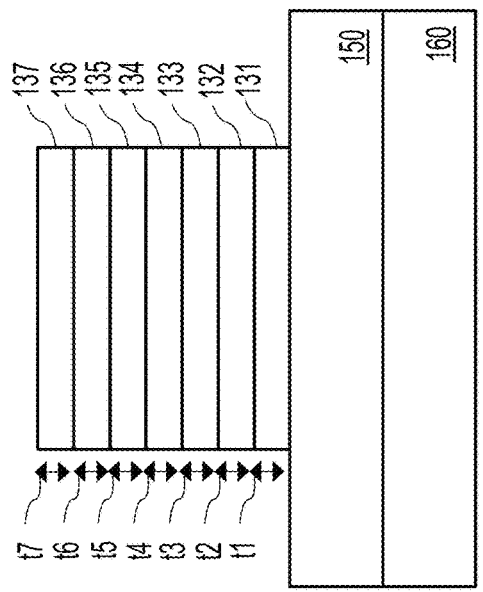
Figure 7F:
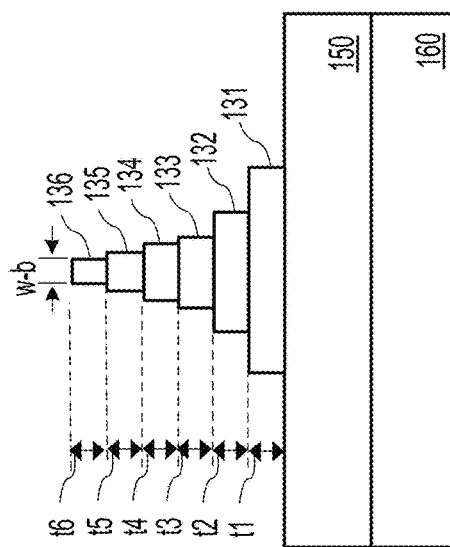

FIG. 7B depicts a cross section of the mode converter 130 at the cut line 143 in FIG. 2, showing a tip of the third stage 133 having a width w-b. Similarly, FIGS. 7C-7F depict cross sections of the mode converter 130 at the cut lines 143-147 in FIG. 2, showing the tips of the four through seventh stages 134-137, respectively, having a width w-b. FIG. 7G depicts a cross section of the output end of the mode converter 130 at the cut line 148 in FIG. 2. FIG. 7G illustrates that, at an output end of the mode converter 130, the plurality of stages has a common maximum width w7, and the mode converter can have a square or rectangular cross-section.

The multiple stages in mode converter 130 can be of non-crystalline silicon. In this disclosure, examples of non-crystalline silicon include amorphous silicon (a-Si) and polycrystalline silicon (poly-Si).

In some embodiments, the spot size converter 100, including the waveguide taper region 110, the extension region 120, and the mode converter 130, can be formed on a single substrate. For example, the waveguide taper region 110, the extension region 120, and the mode converter 130 can be integrated on a SiO$_2$ layer 150 on a handle substrate 160 in a silicon-on-insulator (SO1) wafer. In some embodiments, the waveguide taper region 110 and the extension region 120 can be formed in a crystalline silicon (c-Si) layer of a silicon-on-insulator (SO1) substrate, and the mode converter 130 can be made of non-crystalline silicon. In some embodiments, the ridge portion 114 of the waveguide taper region 110 can also be made of non-crystalline silicon. In some embodiments, the shoulder portion 112 can also be made of non-crystalline silicon. In some embodiments, the extension region 120 can also be made of non-crystalline silicon. In some embodiments, stage 1 of the mode converter can be made of crystalline silicon, and the other stages above stage 1 can be made of non-crystalline silicon. More details of the method for making the various structures are described in U.S. patent application Ser. No. 14/722,983, filed on May 27, 2015, incorporated by reference in its entirety for all purposes.

In crystalline silicon, a lattice structure is well defined. In non-crystalline silicon, a lattice structure is not well defined. Examples of non-crystalline silicon include amorphous silicon (a-Si) and polycrystalline silicon (poly-Si). In polycrystalline silicon, the lattice structure is not well defined, and a polycrystalline-silicon structure comprises multiple crystal lattices. In some embodiments, though non-crystalline silicon may have more loss than crystalline silicon, non-crystalline silicon is used for manufacturing reasons (e.g., for manufacturing tolerances and/or for expanding a beam larger than a crystalline-silicon layer). Another advantage of non-crystalline silicon, in some embodiments, is that non-crystalline has a stable and predictable index of refraction that is similar to crystalline silicon (e.g., the crystalline silicon has a first index of refraction; the non-crystalline silicon has a second index of refraction; and the first index of refraction minus the second index of refraction is less than 0.05, 0.1, 0.2, or 0.3).

Figure 8:
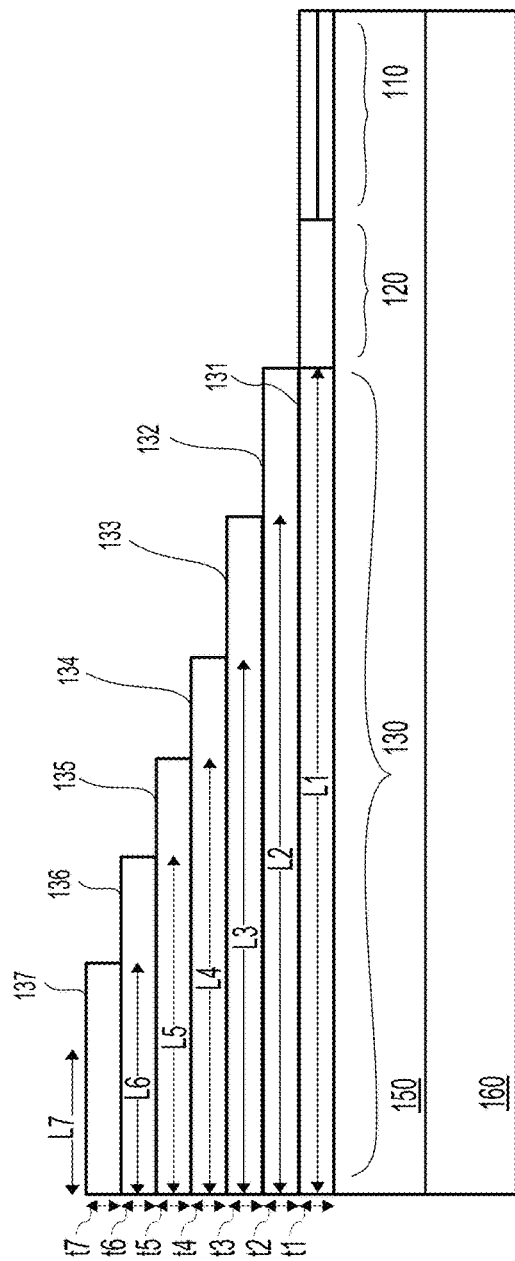
FIG. 8 is a longitudinal cross-sectional view diagram illustrating the multistage spot size converter of FIG. 1 according to some embodiments of the present invention.

FIG. 8 is a longitudinal cross-sectional view diagram illustrating the multistage spot size converter of FIG. 1 according to some embodiments of the present invention. FIG. 8 shows a cross section of the spot size converter 100 through the center of the waveguide taper region 110, the extension region 120, and the mode converter 130, which are integrated on a $SiO_2$ layer 150 on a handle substrate 160 in a silicon-on-insulator (SOI) wafer. The spot size converter 100 is configured to optically couple a semiconductor waveguide, to the right of the waveguide taper region 110, with an optical fiber, to the left of the mode converter 130. Both the semiconductor waveguide and optical fiber are not shown in FIG. 8, but are illustrated in FIG. 10. The mode converter 130 includes multiple stages 131-137, each having a thickness t1-t7 and a length L1-L7, respectively.

Figure 9:
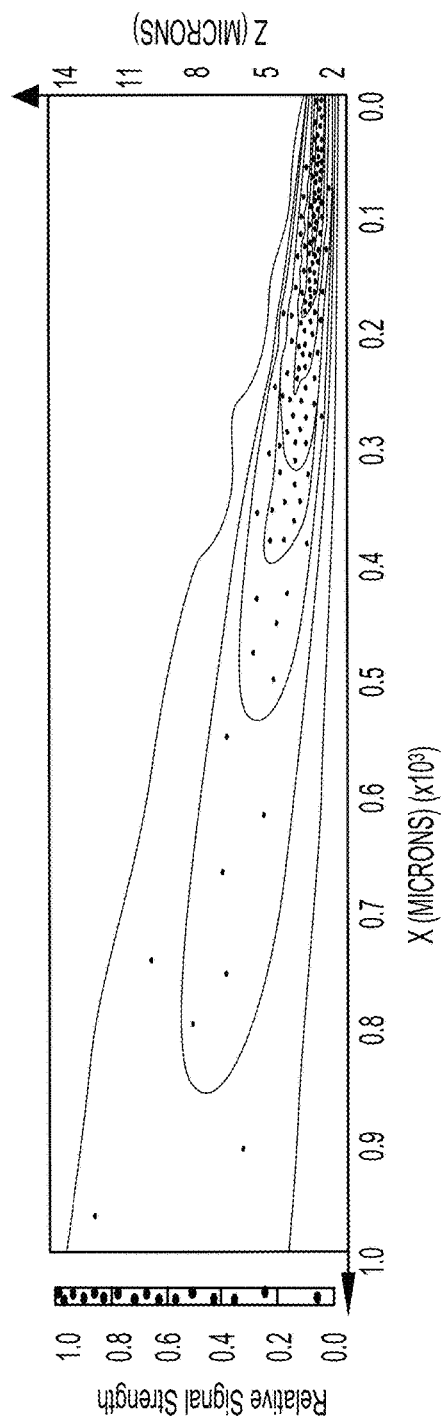
FIG. 9 is a graph illustrating simulated optical signal strength along the longitudinal cross section of the multistage spot size converter of FIG. 1 according to some embodiments of the present invention.

FIG. 9 is a graph illustrating the simulated optical signal strength along the longitudinal cross section of the multistage spot size converter of FIG. 1 according to some embodiments of the present invention. In FIG. 9, a simulated profile of a beam is shown, with the density of the black dots indicating optical signal strength. It can be seen that the small spot size of the beam with high intensity, at the input end on the left hand side, is expanded as it is transmitted along the longitudinal direction through the waveguide taper region 110, the waveguide extension region 120, and the mode converter 130. As the spot size of the beam is expanded, the signal strength density is reduced.

FIG. 10 is a cross-sectional view diagram illustrating the multistage spot size converter coupling waveguide to an optical fiber according to some embodiments of the present invention. FIG. 10 shows a side view of an embodiment of a spot size converter (SSC) 100 optically coupled (e.g., butt coupled) to an optical fiber 200. The spot size converter 100 includes a waveguide taper region 110, an extension region 120, and a mode converter 130, which are integrated on a $SiO_2$ layer 150 on a handle substrate 160 in a silicon-on-insulator (SOI) wafer. The spot size converter (SSC) 100 can be fabricated on the same SOI wafer as a waveguide 10, which can be extended to form the waveguide taper region 110. The optical fiber 200 can include cladding regions 208 surrounding a core region 204. The SSC and optical fiber are well matched so that a lens t is not used to couple light from the SSC to the optical fiber.

Figure 11:
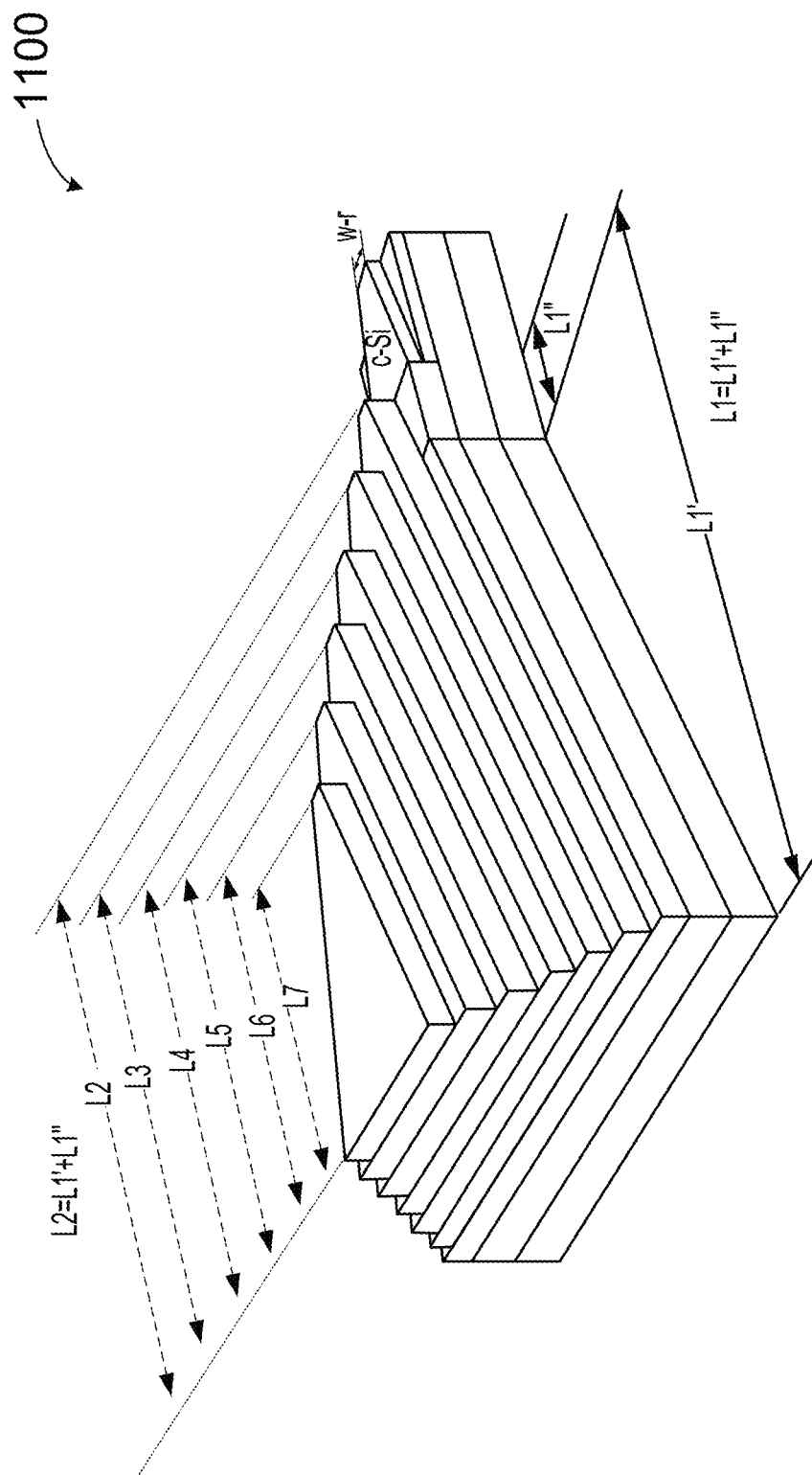
FIG. 11 is a perspective view diagram illustrating a multistage spot size converter according to an alternative embodiment of the present invention.
Figure 12:
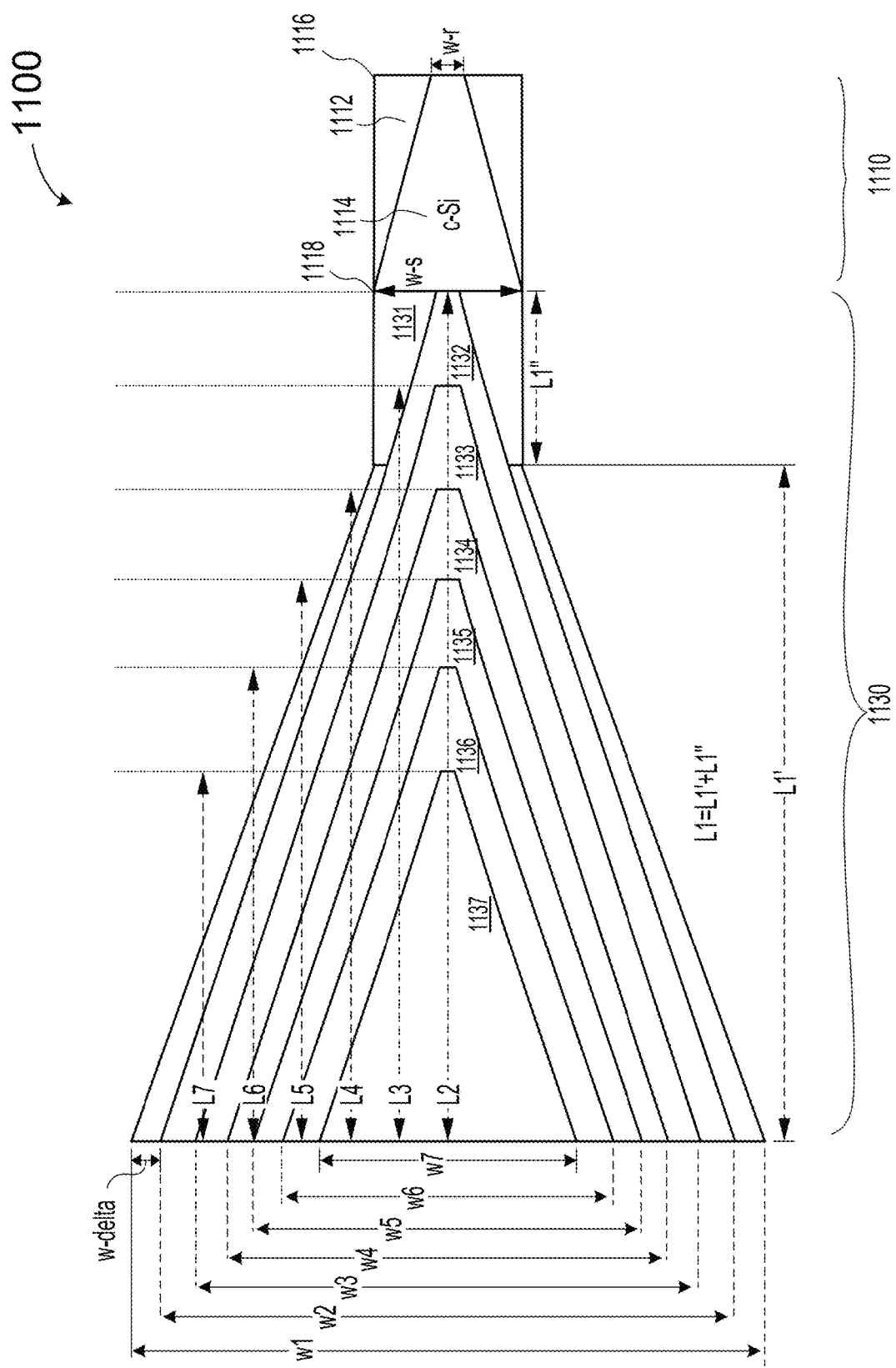
FIG. 12 is a top view diagram illustrating the multistage spot size converter of FIG. 11 according to some embodiments of the present invention.

FIG. 11 is a perspective view diagram illustrating a multistage spot size converter according to an alternative embodiment of the present invention, and FIG. 12 is a top view diagram illustrating the multistage spot size converter of FIG. 11. In FIGS. 11 and 12, similar components and/or features may have the same reference label. The description below may refer to reference labels in one or both of FIGS. 11 and 12.

As shown in FIGS. 11 and 12, the spot size converter 1100 includes a waveguide taper region 1110 and a mode converter 1130. In some embodiments, an extension region can be disposed between the waveguide taper region 1110 and the mode converter 1130, similar to the extension region 120 depicted in FIGS. 1 and 2. The spot size converter 1100 is configured to optically couple a semiconductor waveguide, to the right of the waveguide taper region 1110, with an optical fiber, to the left of the mode converter 1130. Both the semiconductor waveguide and optical fiber are not shown in FIGS. 11 and 12.

The waveguide taper region 1110 is similar to waveguide taper region 1110 depicted in FIGS. 1 and 2, and most of the descriptions of the waveguide taper region 110 are also applicable to the waveguide taper region 1110. For example, the waveguide taper region 1110 includes a shoulder portion 1112 and a ridge portion 1114. The waveguide taper region 1110 has an input end 1116 and an output end 1118. In some embodiments, the input end 1116 is coupled to a waveguide (not shown). The waveguide can have a rectangular cross section. In some embodiments, the waveguide can have a cross section that is not rectangular (e.g., trapezoidal or inverted 'T' shape with a crystalline-silicon ridge on top of a crystalline-silicon shoulder). The output end 1118 of the waveguide taper region 1110 is coupled to the mode converter 1130. Alternatively, the output end 1118 can be coupled with a waveguide extension region, which, in turn, can be coupled to the mode converter 130.

In FIG. 12, the shoulder portion 1112 has a width w-s. The ridge portion 1114 tapers from the input end 1116 to the output end 1118. The ridge has an initial width, w-r, at the input end 1116. The width of the ridge portion 1114 expands from w-r at the input end 1116 to w-s at the output end 1118. The waveguide taper region 1110 helps relax alignment tolerances for coupling to the extension or mode converter. The ridge portion 1114 tapers from the input end 1116 to the output end 1118 so that an optical beam expands as it is transmitted from the input end 1116 to the output end 1118. For example, a beam can be transmitted from an external waveguide (not shown), through the input end 1116 through the output end 1118 of the waveguide taper region 1110, and to an optical fiber having a core larger than the waveguide 10 and larger than the extension region 120. As the beam propagates through the waveguide taper region 1110, the beam expands adiabatically. A direction of beam propagation 124 is shown as an arrow going from the input end 1116 to the output end 1118.

Referring back to FIGS. 11 and 12, the spot size converter 1100 also includes the mode converter 1130. The mode converter 1130 comprises a plurality of stages. In this embodiment, the mode converter 1130 includes seven stages, 1131-1137. An optical beam is expanded going from an input end to an output end. Even though FIGS. 11 and 12 show the mode converter 130 having seven stages, other embodiments of mode converters can have fewer or more stages.

Each stage has a beginning width, w-b, which is the most narrow part of the stage. In some embodiments one or more stages have different beginning widths, w-b.

The mode converter 1130 is similar to the mode converter 130 depicted in FIGS. 1 and 2, and most of the descriptions of the mode converter 130 are also applicable to the mode converter 1130. One notable difference between the mode converter 1130 and the mode converter 130 is that, at the output end, each stage in the mode converter 130 has the same width, resulting in a square or rectangular cross section. On the other hand, each stage in the mode converter 1130 in FIGS. 11 and 12 has a different width at the output end. As shown in FIG. 12, at the output end, the first stage 1131 has a width w1, the second stage 1132 has a width w2, . . . , and the seventh stage 1137 has a width w7. The width of the stage at a higher location has a narrower width than the one stage below. The difference between successive stages, w-delta, can be the same in some embodiments. In other embodiments, w-delta can be different between different pairs of adjacent stages.

In some embodiments, at a cross section of the mode converter at an output end of the device, each stage of the plurality of stages has a different width. A first stage of the plurality of stages, which is closer to the shoulder portion, has a wider width than a second stage of the plurality of stages, which is farther from the shoulder portion than the first stage. The shape of the output end of the mode converter 1130 at the input end and the output end is further illustrated in FIGS. 13 and 14.

Figure 13:
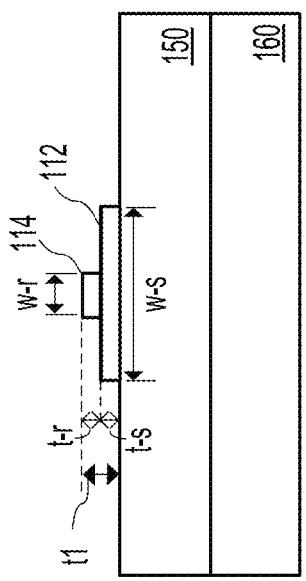
FIG. 13 is an input side cross-sectional view diagram illustrating the multistage spot size converter of FIG. 7 according to some embodiments of the present invention.

FIG. 13 is a cross-sectional view diagram illustrating an input side of the waveguide taper region of the multistage spot size converter 1130 of FIGS. 11 and 12 according to some embodiments of the present invention. FIG. 13 depicts a cross section of the input end 1116 of the waveguide taper region 1110 of the spot size converter 1100 in FIGS. 11 and 12. The waveguide taper region 1110 at the input end comprises the shoulder portion 1112 and the ridge portion 1114. The shoulder portion 1112 has a thickness, t-s, and a width, w-s. In some embodiments, the width, w-s, of the shoulder portion 112 can range between 0.75 and 4.5 μm (e.g., 0.75, 1, 1.25, 1.5, 1.75, 2, 2.25, 2.5, 2.75, 3, 3.5, 4, or 4.5 μm). The thickness (sometimes referred to as height) of the shoulder t-s can range between 0.2 and 2 μm (e.g., 0.2, 0.5, 1.0, 1.5, or 2 μm). The combined thickness, t1, of the shoulder portion 1112 and the ridge portion 1114 can range between 0.75 and 2.25 μm (e.g., 1.0, 1.5, 1.75, 2, or 2.25 μm). The shoulder portion 1112 is made of crystalline silicon (c-Si). In some embodiments, the shoulder portion 1112 can be simply an extension of an external waveguide (not shown) fabricated on a substrate (e.g., a substrate comprising silicon on insulator and/or SiO2). In some embodiments, the waveguide taper region 110 can further comprise a substrate and/or cladding material.

Figure 14:
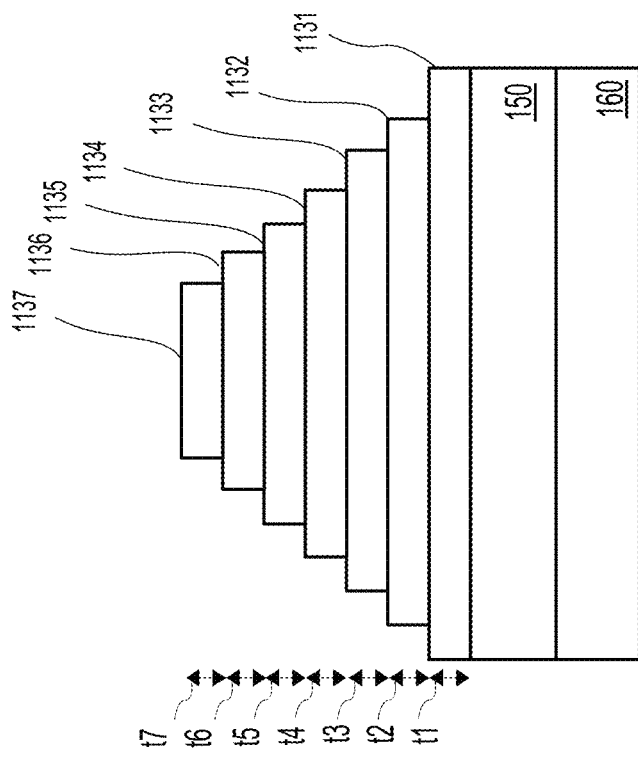
FIG. 14 is an output side cross-sectional view diagram illustrating the multistage spot size converter of FIG. 7 according to some embodiments of the present invention.

FIG. 14 is an output side cross-sectional view diagram illustrating the multistage spot size converter of FIG. 11 according to some embodiments of the present invention. FIG. 14 shows cross sections of seven stages 1131, 1132, . . . , 1137 of the mode converter 1130. It can be seen that each successive stage has a narrower width than the previous stage. The resulting pyramid or triangular shape cross section of the mode converter 1130 can be used to couple to an optical fiber to achieve a different mode conversion.

Figure 15:
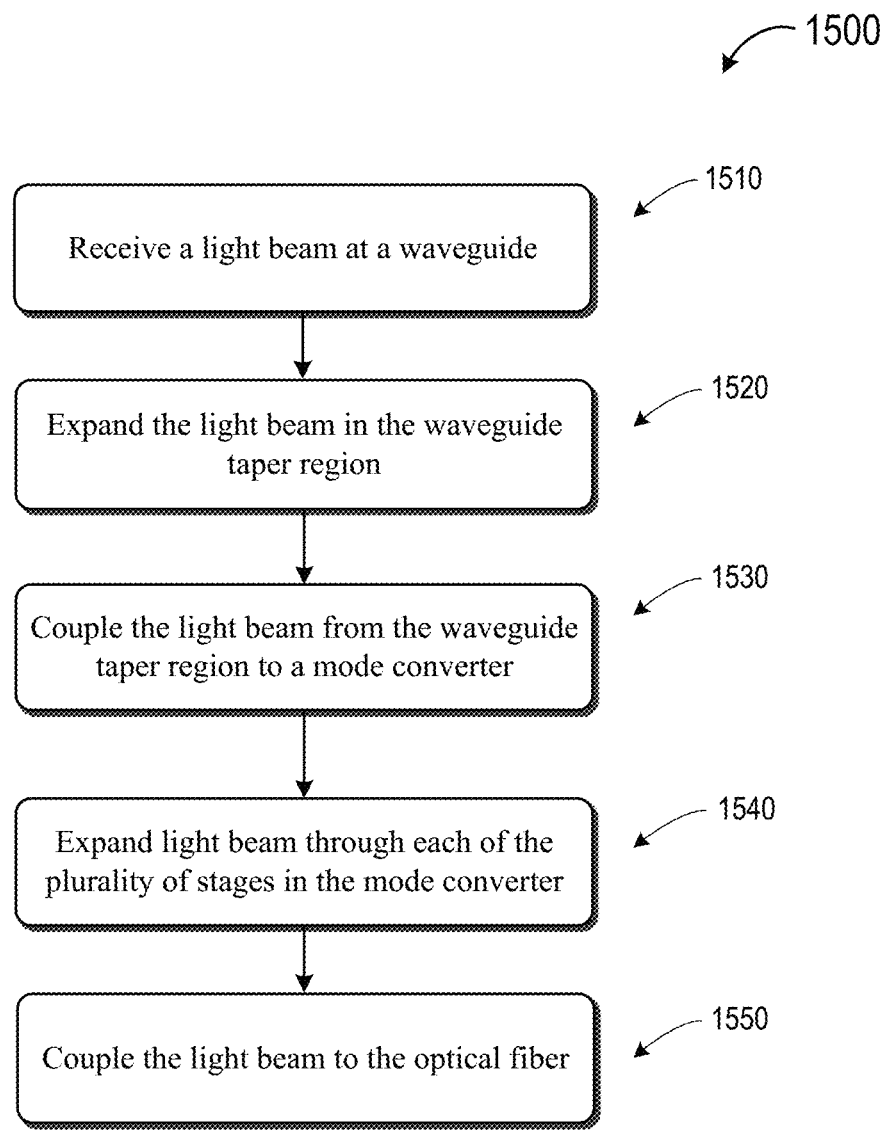
FIG. 15 shows a flowchart of an embodiment of a method for converting optical mode spot size between a semiconductor waveguide and an optical fiber according to some embodiments of the present invention.

FIG. 15 is a flowchart summarizing a method 1500 for converting optical mode spot size between a semiconductor waveguide and an optical fiber. The method 1500 includes, at process 1510, receiving a light beam at a waveguide comprising a waveguide taper region, which can have a shoulder portion and a ridge portion above the shoulder portion, the ridge portion having a width that tapers to meet a width of the shoulder portion, the waveguide taper region comprising a first material. At process 1520, the method includes expanding the light beam in the waveguide taper region. The method 1500 further includes coupling the light beam from the waveguide taper region to a mode converter, at 1530. The mode converter comprises a plurality of stages. Each of the plurality of stages tapers in a direction similar to a direction of taper of the waveguide taper region. The mode converter is made of a second material different from the first material. At process 1540, the method 1500 includes expanding the light beam through each of the plurality of stages in the mode converter. At process 1550, the method includes coupling the light beam to the optical fiber.

In some embodiments, the method 1500 also includes transmitting the light beam through a first stage of the mode converter to a second stage. The first stage comprises a first portion that does not taper and a second portion that tapers. Further, the second stage extends over the first portion and the second portion of the first stage.

In some embodiments, the method 1500 also includes transmitting the light beam through a waveguide extension region coupled between the waveguide taper region and the mode converter. The waveguide extension region is made of the first material. The waveguide extension region has a thickness equal to a combined thickness of the shoulder portion and the ridge portion of the waveguide taper region. The waveguide extension region and the shoulder portion of the waveguide taper region have a common width.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a," "an," or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for manufacturing a device for optical mode spot size conversion, the method comprising:
   providing a substrate having a device layer disposed on the substrate, wherein the device layer comprises a first material;
   etching the device layer to form a waveguide;
   etching the device layer to form a waveguide taper region, wherein:
   the waveguide taper region comprises a shoulder portion and a ridge portion, the ridge portion oriented along a direction of beam propagation, the ridge portion having a width that tapers to meet a width of the shoulder portion; and
   forming a mode converter coupled with the waveguide taper region, wherein:
   the mode converter comprises a plurality of stages;
   each of the plurality of stages tapers in a direction similar to a direction of taper of the ridge portion of the waveguide taper region; and
   the mode converter is made of a second material different from the first material.

2. The method claim 1, wherein the ridge portion of the waveguide taper region is disposed directly above the shoulder portion of the waveguide.

3. The method claim 1, further comprising:
   applying a photoresist on the device layer;
   etching the device layer to form a first recess, the first recess having a shape of a first pattern;
   removing photoresist from the device layer;
   filling the first recess with a second material different from the first material;

etching the device layer to define the waveguide, and
etching the second material to form a first stage of the mode converter, such that the first stage of the mode converter is aligned with the waveguide;
covering the substrate with a first cladding;
applying photoresist on the first cladding;
etching the first cladding to form a second recess, the second recess having a shape of a second pattern;
removing photoresist from the first cladding; and
filling the second recess with the second material to forms a second stage of the mode converter.

4. The method claim 3, wherein:
the waveguide taper region comprises crystalline silicon in the device layer disposed on a buried-oxide layer of an SOI (silicon-on-insulator) substrate; and
the mode converter comprises non-crystalline silicon formed on the buried-oxide layer of the SOI substrate.

5. The method claim 3, wherein etching the first cladding uses a highly selective etch such that the first cladding is more easily etched than the first material and the second material.

6. The method claim 3, wherein:
the first stage of the mode converter comprises a first portion that does not taper and a second portion that tapers; and
the second stage of the mode converter extends over the first portion and the second portion of the first stage.

7. The method claim 6, wherein the first portion of the first stage of the mode converter and the shoulder portion of the waveguide have a common width.

8. The method claim 3, further comprising:
applying a second cladding on the second stage of the mode converter;
etching the second cladding to form a third recess, the third recess having a shape of a third pattern; and
filling the third recess with additional second material to form a third stage of the mode converter.

9. The method claim 8, wherein the number of stages in the mode converter is seven.

10. The method claim 1, wherein the waveguide further comprises a waveguide extension region coupled between the waveguide taper region and the mode converter, wherein:
the waveguide extension region is made from the device layer;
the waveguide extension region has a thickness equal to a combined thickness of the shoulder portion and the ridge portion of the waveguide taper region; and
the waveguide extension region and the shoulder portion of the waveguide taper region have a common width.

11. The method claim 10, wherein the waveguide extension region has a common thickness as the waveguide taper region and a first stage of the mode converter.

12. The method claim 10, wherein the waveguide extension region has a common width as an output end of the waveguide taper region and an input end of a first stage of the mode converter.

13. A method for manufacturing a device for optical mode spot size conversion, the method comprising:
providing a substrate having a device layer disposed on the substrate, the device layer comprising a first material;
etching the device layer to form a waveguide and a first stage of a mode converter coupled to the waveguide, wherein the waveguide comprises a waveguide taper region having a shoulder portion and a ridge portion, the ridge portion disposed directly above the shoulder portion and oriented along a direction of beam propagation, the ridge portion having a width that tapers to meet a width of the shoulder portion; depositing a cladding layer over the substrate;
forming a first cladding on the device layer;
applying photoresist on the first cladding;
etching the first cladding to form a first recess, the first recess having a shape of a first pattern;
removing photoresist from the first cladding;
filling the first recess with a second material to form a second stage of the mode converter.

14. The method of claim 13, wherein the first material is crystalline silicon and the second material is non-crystalline silicon.

15. The method of claim 13, wherein the device layer comprises crystalline silicon disposed on a buried-oxide layer of an SOI (silicon-on-insulator) substrate.

16. The method of claim 13, wherein the waveguide further comprises a waveguide extension region coupled between the waveguide taper region and the mode converter.

17. The method of claim 16, wherein:
the waveguide extension region has a thickness equal to a combined thickness of the shoulder portion and the ridge portion of the waveguide taper region; and
the waveguide extension region and the shoulder portion of the waveguide taper region have a common width.

18. A method for manufacturing a device for optical mode spot size conversion, the method comprising:
providing a substrate having a device layer disposed on the substrate, wherein the device layer comprises a first material;
etching the device layer to form a waveguide and a waveguide extension region;
etching the device layer to form a waveguide taper region, the waveguide taper region coupled to the waveguide extension region, wherein:
the waveguide taper region comprises a shoulder portion and a ridge portion, the ridge portion having a width that tapers to meet a width of the shoulder portion; and
the waveguide extension region has a thickness equal to a combined thickness of the shoulder portion and the ridge portion of the waveguide taper region; and
the waveguide extension region and the shoulder portion of the waveguide taper region have a common width; and
forming a mode converter coupled to the waveguide extension region, wherein:
the mode converter comprises a plurality of stages;
each of the plurality of stages tapers in a direction similar to a direction of taper of the ridge portion of the waveguide taper region;
the mode converter comprises a first stage and a second stage of the plurality of stages, the first stage comprising a first portion that does not taper and a second portion that tapers; and
the second stage extends over the first portion and the second portion of the first stage; and
the mode converter is made of a second material different from the first material.

19. The method of claim 18, wherein the ridge portion of the waveguide taper region tapers from a narrower width of 0.75-2.75 µm near an input end to a wider width of 2.0-4.5 µm near an output end.

20. The method of claim 18, wherein the waveguide extension region has a common thickness as the waveguide taper region and the first stage of the mode converter.

\* \* \* \* \*